(12) United States Patent
Daoura et al.

(10) Patent No.: US 11,139,640 B1
(45) Date of Patent: Oct. 5, 2021

(54) BREAKER PLUG

(71) Applicants: Daniel J Daoura, Renton, WA (US); Kal K Lambert, Hammond, OR (US)

(72) Inventors: Daniel J Daoura, Renton, WA (US); Kal K Lambert, Hammond, OR (US)

(\*) Notice: Subject to any disclaimer, the term of this patent is extended or adjusted under 35 U.S.C. 154(b) by 0 days.

(21) Appl. No.: 17/144,106

(22) Filed: Jan. 7, 2021

Related U.S. Application Data

(60) Provisional application No. 62/963,119, filed on Jan. 19, 2020.

(51) Int. Cl.
| | |
|---|---|
| *H02B 1/056* | (2006.01) |
| *H01H 83/20* | (2006.01) |
| *H01H 71/10* | (2006.01) |
| *H02B 1/052* | (2006.01) |
| *H01H 71/46* | (2006.01) |

(52) U.S. Cl.
CPC ......... *H02B 1/056* (2013.01); *H01H 71/1009* (2013.01); *H01H 71/46* (2013.01); *H01H 83/20* (2013.01); *H02B 1/052* (2013.01)

(58) Field of Classification Search
CPC ........ H02B 1/041; H02B 1/043; H02B 1/044; H02B 1/052; H02B 1/056; H01H 71/1009; H01H 71/46
See application file for complete search history.

(56) References Cited

U.S. PATENT DOCUMENTS

| | | | |
|---|---|---|---|
| 2,656,439 A | 10/1953 | Gelzheiser | |
| 2,883,587 A | 4/1959 | Dorfman | |
| 2,921,240 A | 1/1960 | Cole | |
| 3,120,628 A | 2/1964 | Edmunds | |
| 3,160,791 A | 12/1964 | Jacobs | |
| 3,170,744 A * | 2/1965 | Farnsworth | .......... H01R 13/514 |
| | | | 439/106 |
| 3,369,202 A | 2/1968 | Gryctko | |
| 3,402,328 A | 9/1968 | Gryctko | |
| 3,743,891 A | 7/1973 | Buxton | |
| 3,745,414 A | 7/1973 | Frantti | |

(Continued)

FOREIGN PATENT DOCUMENTS

| | | | | |
|---|---|---|---|---|
| CA | 2554685 C | * | 9/2011 | ............... H02B 1/52 |
| JP | H09271118 A | * | 10/1997 | ............. H02B 1/306 |

*Primary Examiner* — Robert J Hoffberg

(57) ABSTRACT

A rail-mountable electrical device having a "plug-in" receptacle for receiving a pluggable power cord in series with the circuit breaker while mounted on a hot bus bar within a breaker panel. In a first embodiment, the AC circuit breaker/receptacle combination device provides an accessible power outlet direct inside the breaker panel, for example during early construction when wiring of peripheral outlets has not been completed. Disclosed in a second embodiment is a dummy breaker body which comprises a plug receptacle and no circuit breaker. The dummy breaker body seats on the hot bus bar in a breaker panel but does not draw electricity directly, and instead is wired in series with a true circuit breaker proximate on the hot bus bar in a cis- or transposition. The two body parts, dummy breaker body and circuit breaker, function independently but in series electrical connection. In the various embodiments, NEMA-type or aviation-type plug receptacles are conveniently made accessible within the breaker panel using these devices.

11 Claims, 27 Drawing Sheets

(56) References Cited

U.S. PATENT DOCUMENTS

| | | | |
|---|---|---|---|
| 3,818,282 A * | 6/1974 | Buxton | H02B 1/50 |
| | | | 361/627 |
| 3,922,586 A * | 11/1975 | Buxton | H02B 1/056 |
| | | | 361/643 |
| 4,546,418 A | 10/1985 | Baggio | |
| 4,642,733 A * | 2/1987 | Schacht | H02B 1/056 |
| | | | 361/118 |
| 4,878,144 A | 10/1989 | Nebon | |
| 4,900,275 A | 2/1990 | Fasano | |
| 5,053,919 A * | 10/1991 | Schacht | H02B 1/056 |
| | | | 361/652 |
| 5,142,646 A * | 8/1992 | Nachtigall | H02H 3/16 |
| | | | 361/42 |
| 5,446,386 A | 8/1995 | Pollman | |
| 5,510,759 A | 4/1996 | Gula | |
| 5,574,612 A * | 11/1996 | Pak | H01R 9/2491 |
| | | | 361/115 |
| 5,784,249 A | 7/1998 | Pouliot | |
| 6,052,046 A | 4/2000 | Ennis | |
| 7,817,405 B2 * | 10/2010 | Neumann | H02B 1/52 |
| | | | 361/625 |
| 7,864,509 B1 * | 1/2011 | Remmert | H02B 1/056 |
| | | | 361/631 |
| 7,957,121 B1 * | 6/2011 | Nichols | H02B 1/056 |
| | | | 361/643 |
| 8,570,714 B2 * | 10/2013 | Weighell | H02B 1/056 |
| | | | 361/621 |
| 8,902,570 B2 * | 12/2014 | Cosley | H02B 1/42 |
| | | | 361/632 |
| 8,929,055 B2 | 1/2015 | Potratz | |
| 8,982,539 B2 * | 3/2015 | Weighell | H02B 1/056 |
| | | | 361/621 |
| 9,601,295 B2 | 3/2017 | Deboer | |
| 9,666,398 B2 | 5/2017 | Robinson | |
| 9,824,839 B2 | 11/2017 | Watford | |
| 10,020,152 B2 | 7/2018 | Pearson | |
| 2019/0096598 A1 | 3/2019 | Schmalz | |

\* cited by examiner

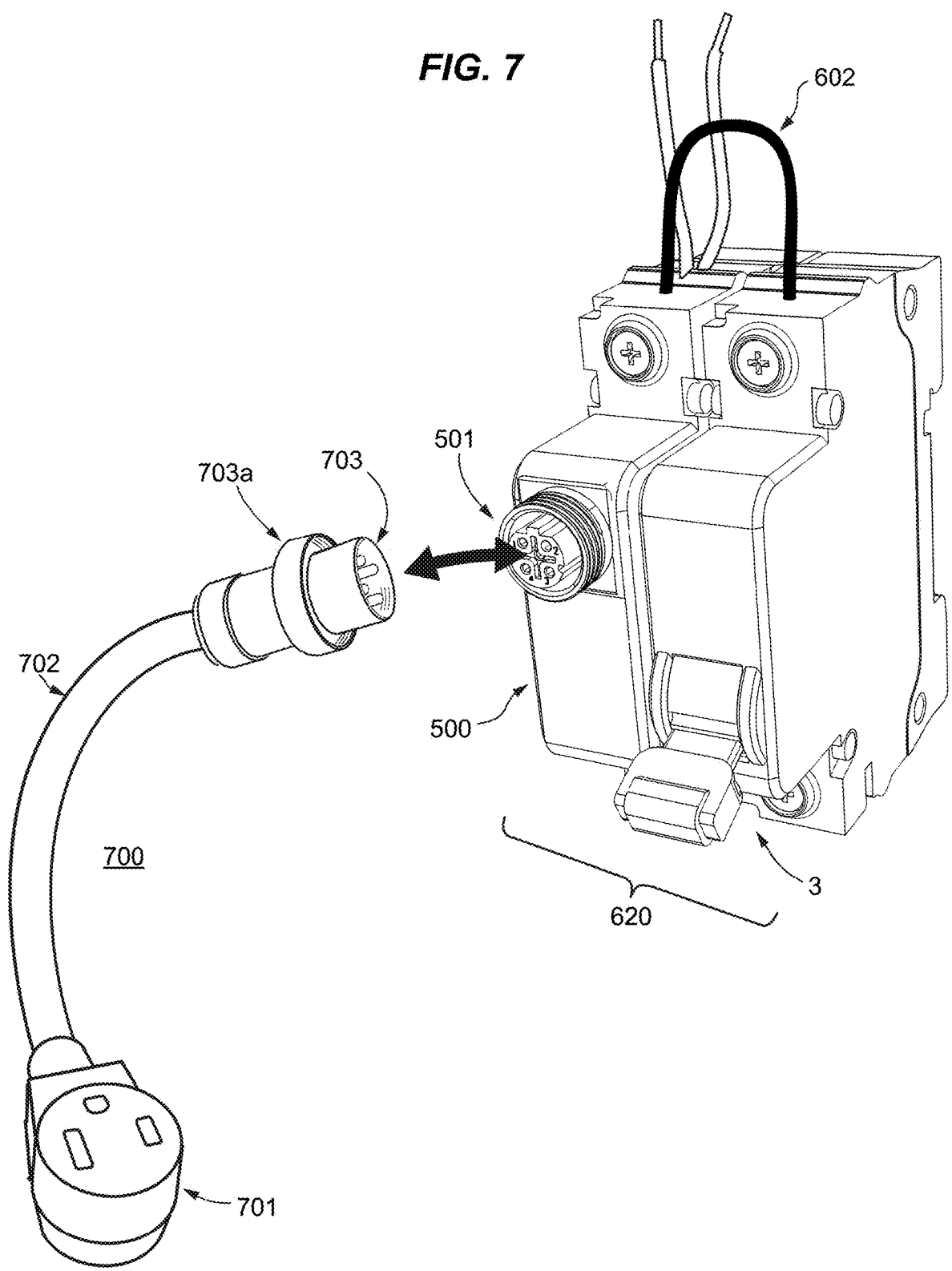

240 VAC BREAKER-PLUG COMBINATION

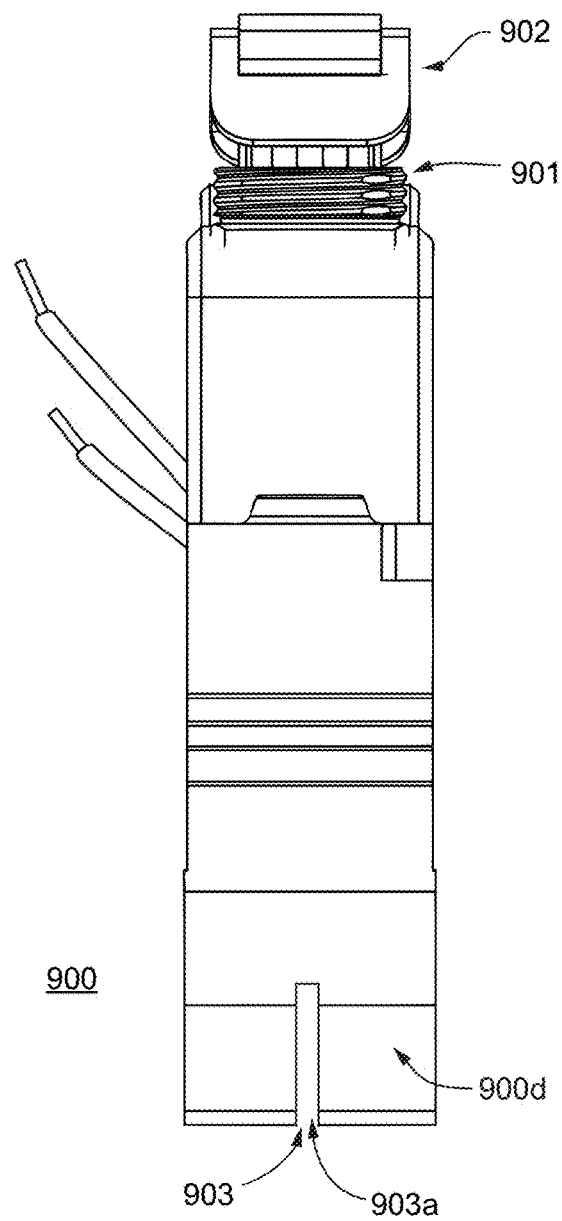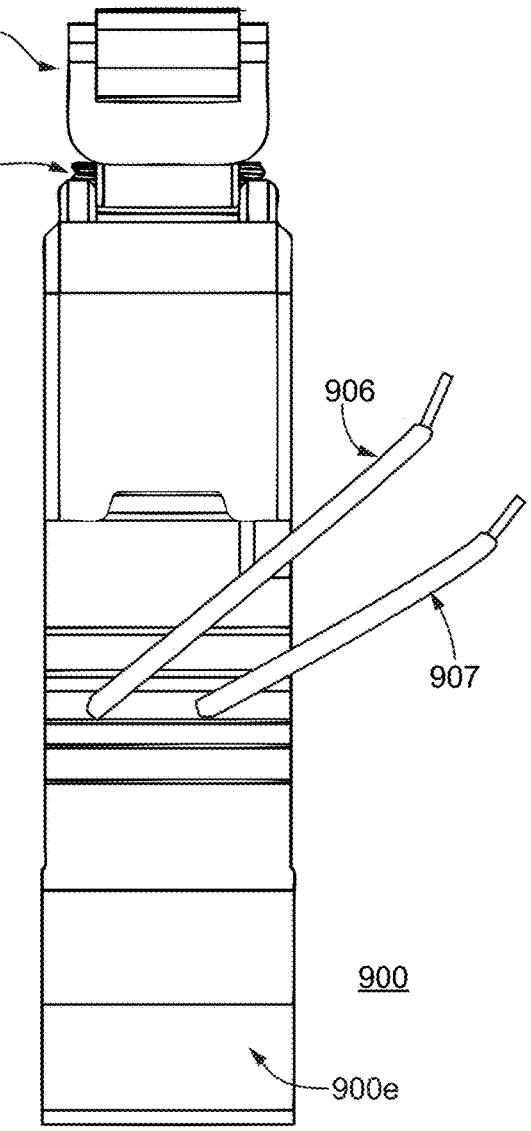

FIG. 11B  FIG. 11C
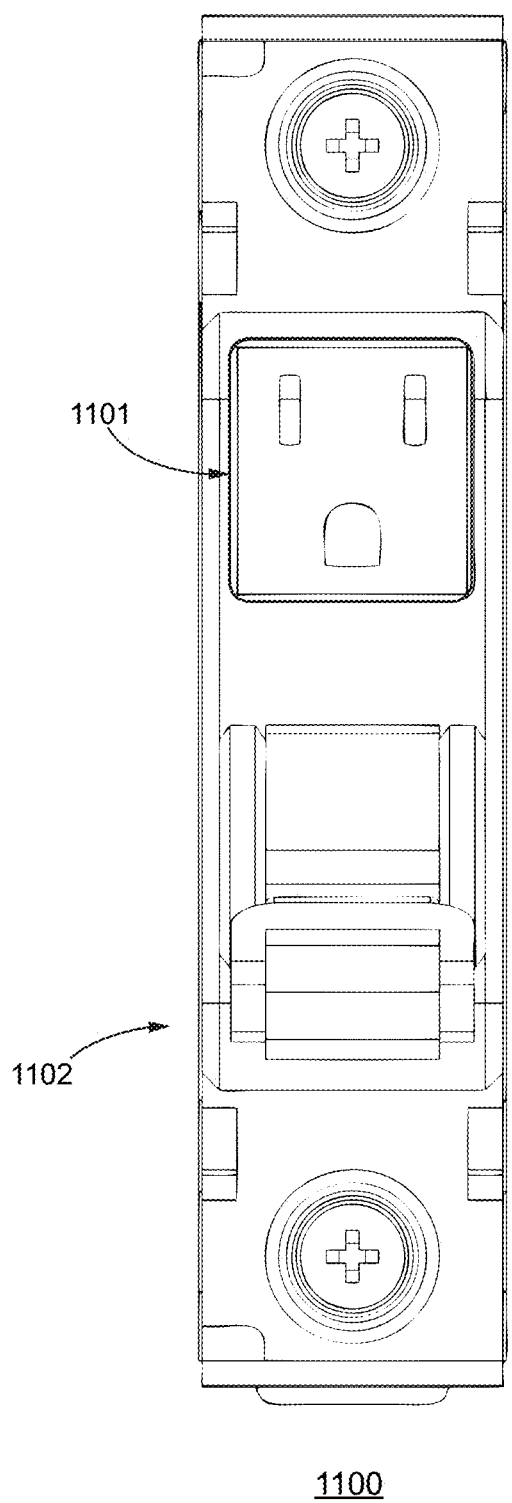
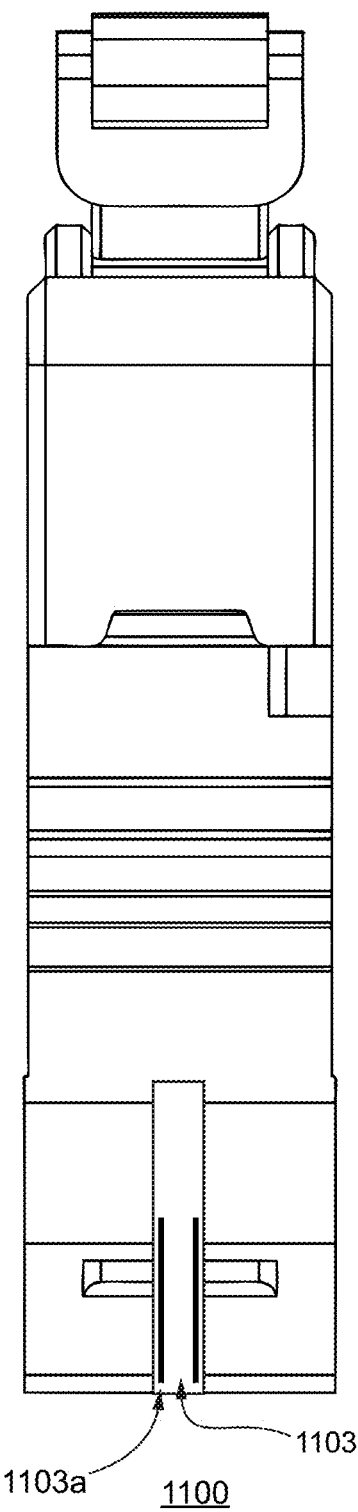

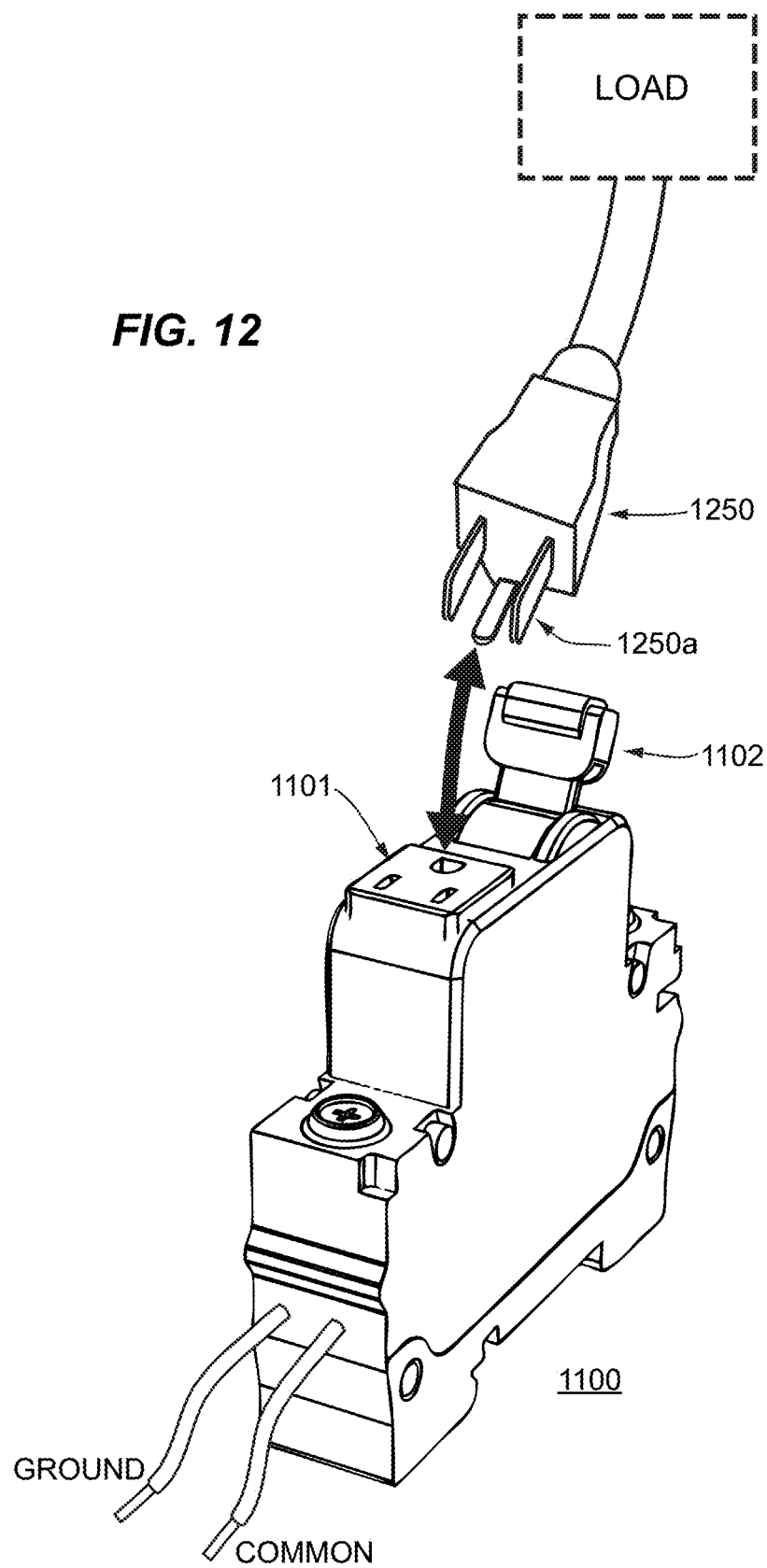

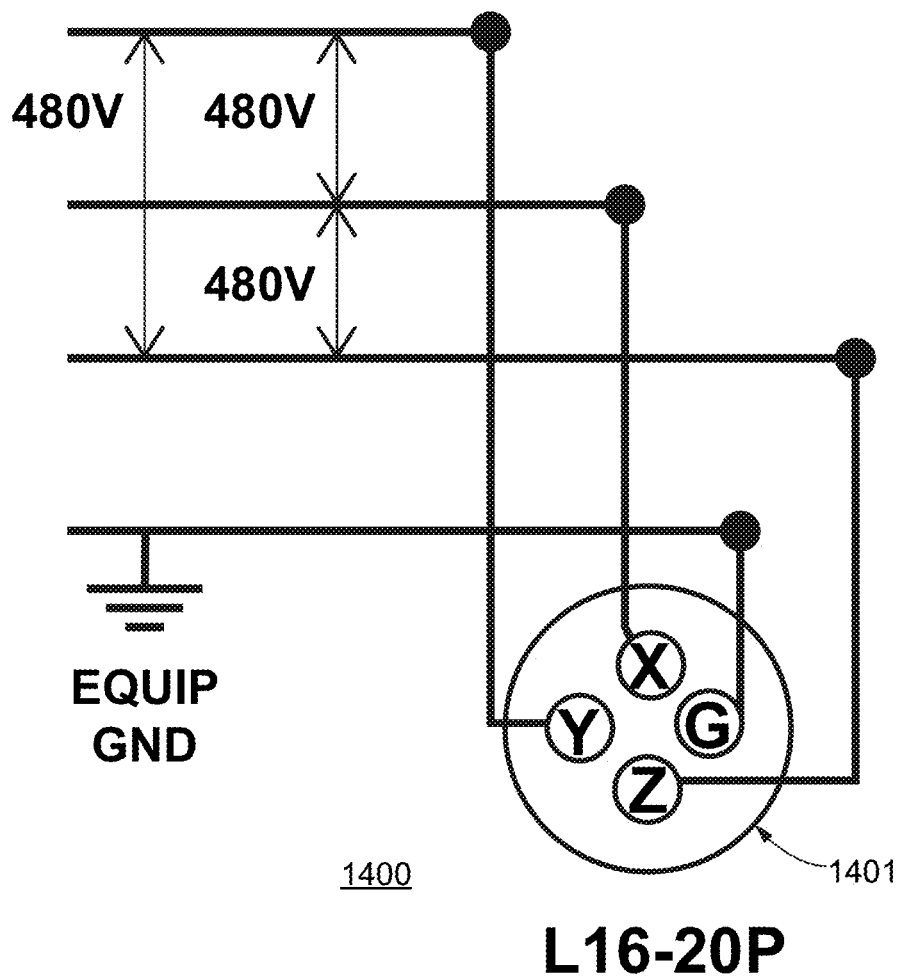

L16-30R

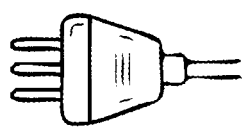
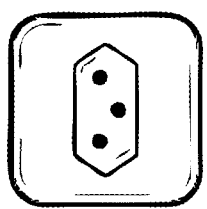
type J
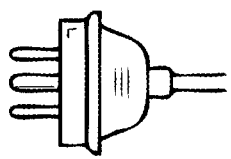
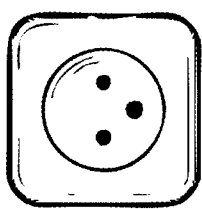
type K
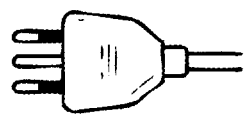
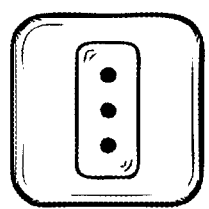
type L
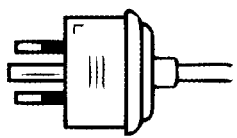
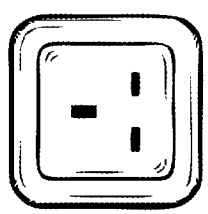
type G
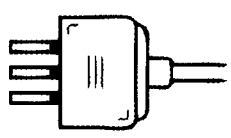
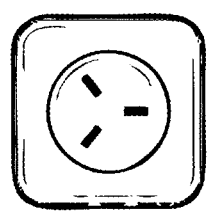
type H
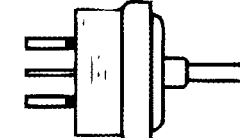
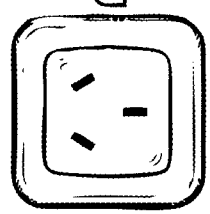
type I
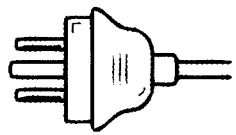
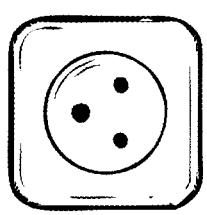
type D
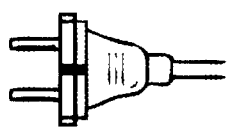
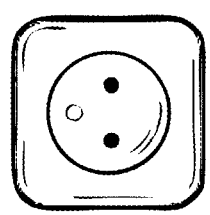
type E
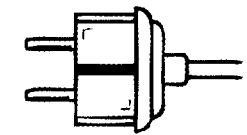
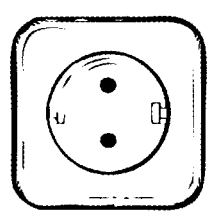
type F
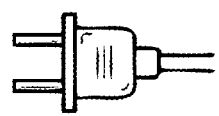
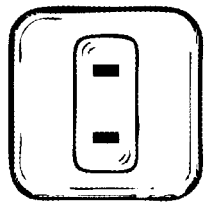
type A
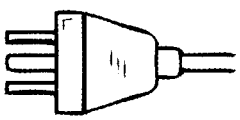
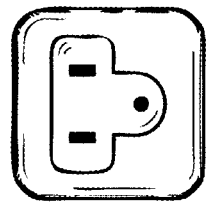
type B
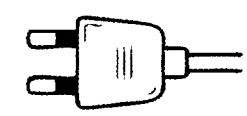
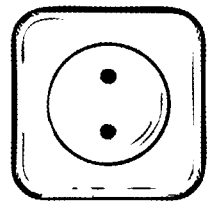
type C
*FIG. 18*

FIG. 20
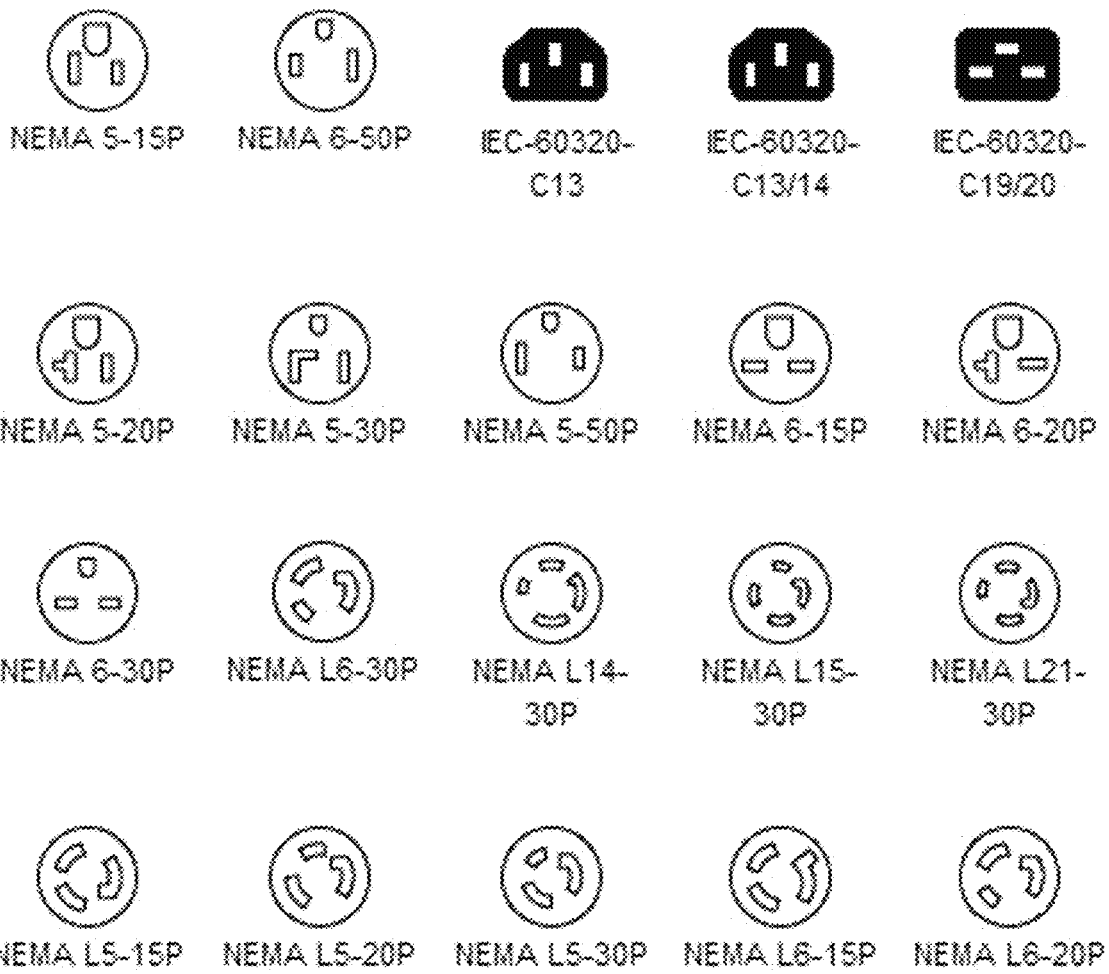
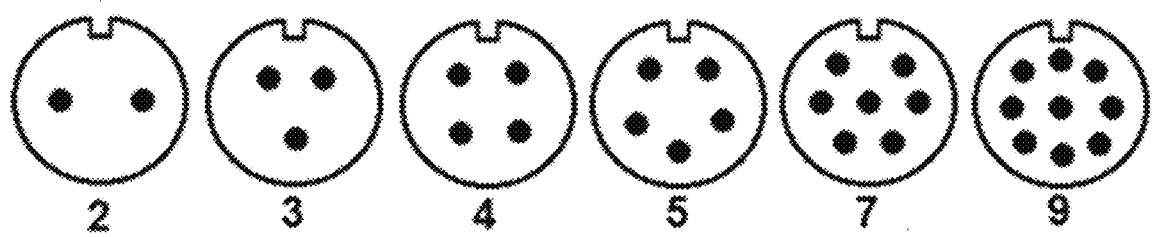
FIG. 21

BREAKER PLUG

CROSS REFERENCE TO RELATED APPLICATIONS

This application is related to and claims priority to U.S. Provisional Patent Ser. No. 62/963,119 entitled "Breaker Plug," filed Jan. 19, 2020, which is herein incorporated in full by reference for all purposes.

TECHNICAL FIELD

This disclosure pertains generally to the field of solutions for accessing AC electrical power from a breaker panel.

BACKGROUND

A solution to the problem of temporarily tapping power directly from a breaker panel is addressed. The problem is of interest to homebuilders, tradespersons, and hobbyists and has general interest in industries where electrical power is used.

SUMMARY

Disclosed in a first embodiment is a "circuit breaker/plug" combination, which comprises, in a single unit, a circuit breaker body with throw switch for single phase AC power (or switches for three-phase AC power) and a magnetic fuse or fuses—plus a plug receptacle in series. The circuit breaker is configured to be connectedly mounted to a bus bar in a breaker panel and the plug receptacle is configured to receive a detachable cord-mounted plug for conveying alternating current to an appliance or tool in need of power. The circuit breaker/plug unit is affixed in the breaker panel on a rail, clips to the power supply as standard for the country of use and conforms to a modular standard so as to be interchangeable with other circuit breaker units. Also disclosed is a method of powering an electrical appliance, which comprises mounting a circuit breaker/plug combination in a breaker panel and plugging the appliance directly into the accessible plug.

Combination circuit breaker/plug receptacle devices are configured to comply with standards for use in domestic and industrial breaker panels. The modular devices snap into place on hot shoes or on a rail of a bus bar and may be removed when not in use or may be permanently installed without causing mechanical interference with the breaker panel door. When the breaker panel door is closed, the breaker devices are not in use. In variants of the invention, models compatible with 120 VAC, 240 VAC and 480 VAC, single phase and three phase may be provided with receptacles/adaptors for receiving mating electrical cords. The circuit breakers may be calibrated according to accepted ratings from 15 Amp to 20 Amp to 50 Amp or higher. A thermal fuse is generally provided. GFI models may also be provided. By providing a circuit breaker connected to a street feed or some other power supply such as a generator upstream from the plug receptacle, safety is not sacrificed when operating tools or appliances connected directly from within a breaker panel.

Disclosed in a second embodiment is a device having a modular dummy circuit breaker body which comprises a plug receptacle—but no working circuit breaker. The modular dummy breaker body seats on the hot bus bar in a breaker panel in the same way as a conventional circuit breaker, but does not receive power via a hot shoe in the base of the body, and is wired instead in series with an adjacent genuine circuit breaker. Advantageously, in this embodiment, the circuit breaker body is a conventional assembly, but is wired in series with the dummy breaker body so that the plug receptacle can be used while protected by the circuit breaker from overload, short, or overheating, for example. The two body units are wired separately and may sit crosswise (head-to-head) or side-by-side within the breaker panel. If side-by-side, the "single-wide" bodies (each modular unit width defining a standard width) may be contacted at an opposing lateral wall and are wired as a "double-wide" pair of modular units in the breaker panel such that a lateral wall of the circuit breaker rests beside a lateral wall of the dummy breaker body. Alternatively, the two body units may be wired in a trans-position in which the body units sit head-to-head in the breaker panel, the hot wire from the circuit breaker extends to the dummy breaker plug body, and the common or neutral wire runs from the dummy breaker plug body to the common or neutral bus bar and optionally is grounded to a ground strap or bus within the breaker panel.

The elements, features, steps, and advantages of one or more embodiments will be more readily understood upon consideration of the following detailed description, taken in conjunction with the accompanying drawings, in which embodiments, including details, conceptual elements, and current practices, are illustrated by way of example.

It is to be expressly understood, however, that the drawings are for illustration and description only and are not intended as a definition of the limits of the embodiments and conceptual basis as claimed. The various elements, features, steps, and combinations thereof that characterize aspects of the claimed matter are pointed out with particularity in the claims annexed to and forming part of this disclosure. The invention(s) do not necessarily reside in any one of these aspects taken alone, but rather in the invention(s) taken as a whole.

BRIEF DESCRIPTION OF THE DRAWINGS

One or more embodiments are taught and are more readily understood by considering the drawings in association with the specification, in which:

In FIG. 4B, the dummy breaker is wired in series to a circuit breaker in a side-by-side "cis" position.

FIG. 7 is a view of an adaptor with AC plug and a male aviation-type fitting that plugs into an aviation-type plug receptacle of a dummy breaker body wired in series with an AC circuit breaker.

FIGS. 9A, 9B, 9C, 9D, 9E and 9F are isometric and perspective views of a combination circuit breaker/plug body with plug receptacle as a single device.

FIGS. 11A, 11B, 11C, and 11D are isometric and perspective views of a combination circuit breaker/plug body with 120 VAC NEMA 15-5 plug receptacle.

FIG. 12 shows the combination circuit breaker/plug device in a context of use.

FIG. 14 is a schematic showing a 480 VAC circuit breaker/plug receptacle and wiring.

As suggested by FIG. 18, the circuit breaker/plug assembly may be modified to include any of a broad variety of plug receptacles known in the art.

Figure 19:
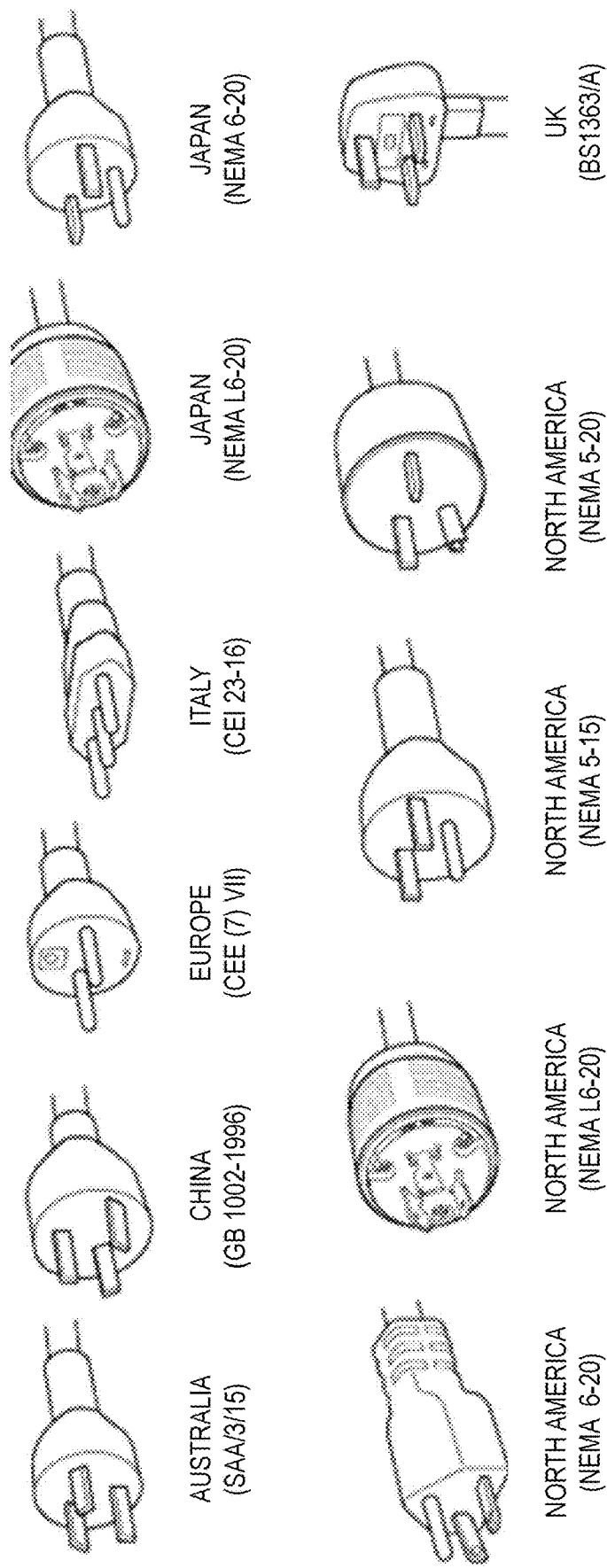

Examples of various plugs according to country of use are shown in FIG. 19.

FIG. 20 is a graphical representation of various connectors, here showing receptacles according to the NEMA standards used commonly in the United States.

FIG. 21 is a view of single-keyway circular aviation connectors; the connectors have two to nine pin receptacles as commonly known and used.

Figure 22:
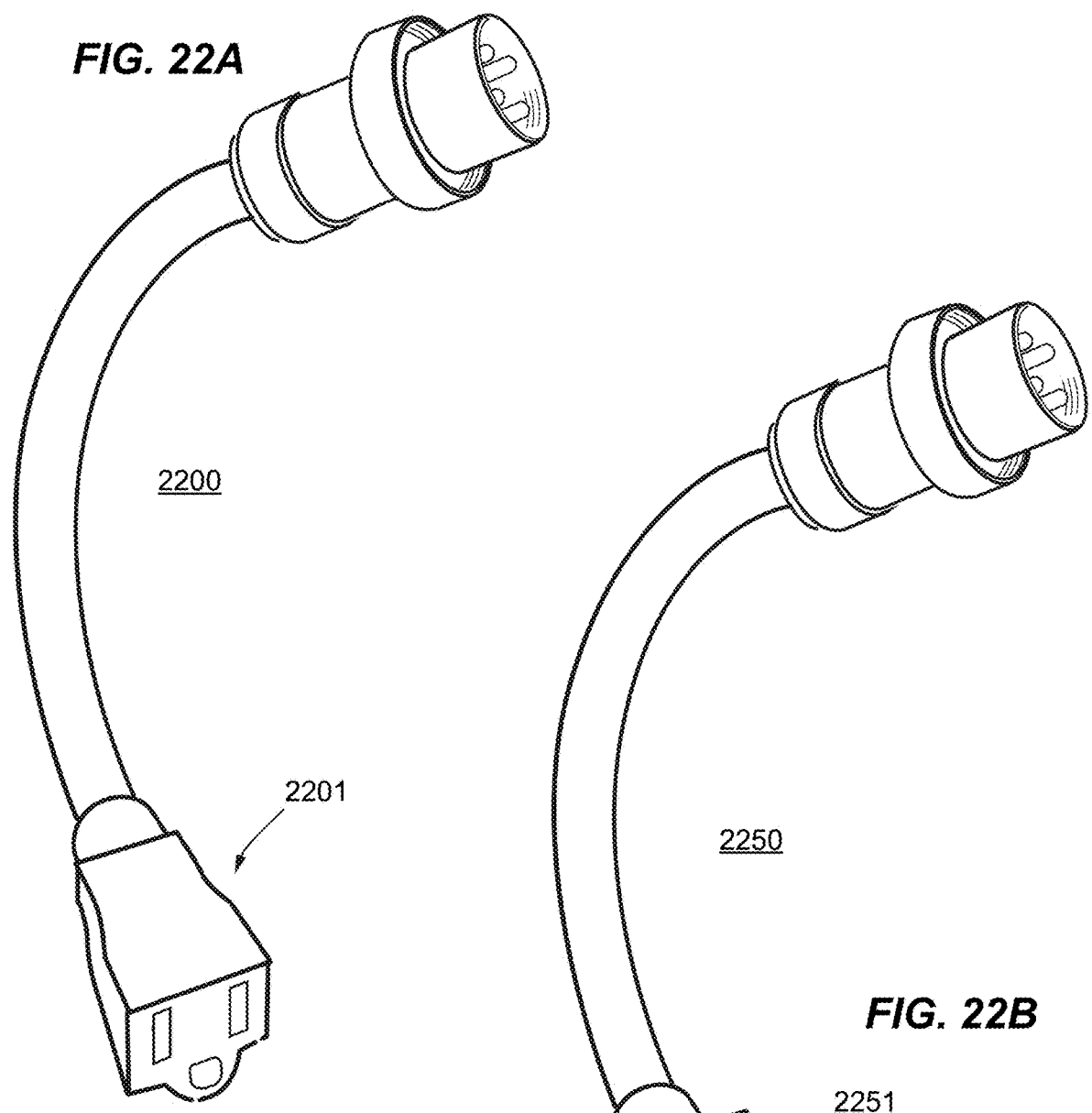

FIGS. 22A and 22B are views of two adaptor cords having each a short cord with two distinct ends.

Figure 23:
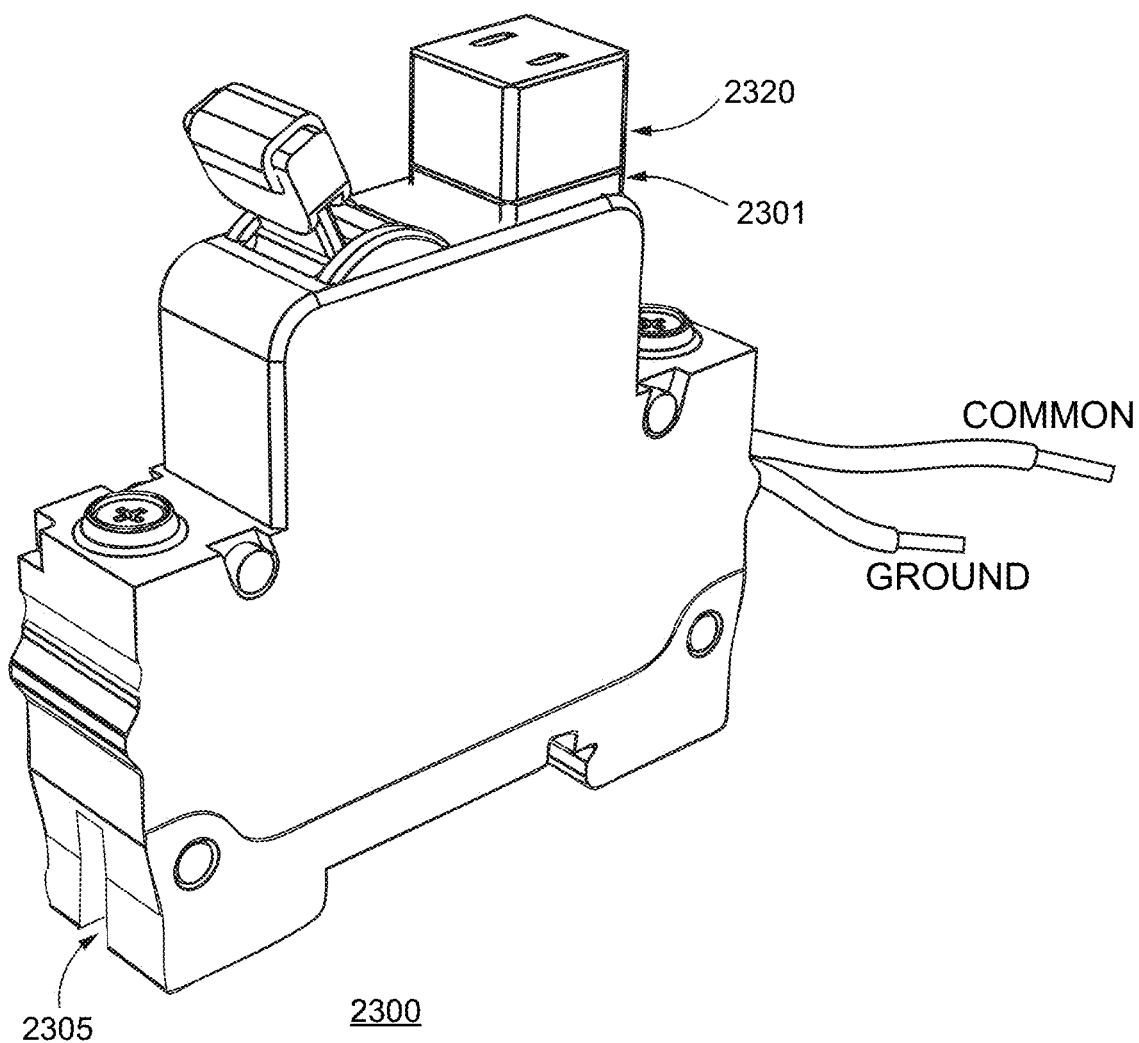

FIG. 23 is a view of a grounded circuit breaker/plug body and a "plug-in" 2-prong adaptor.

The drawing figures are not necessarily to scale. Certain features or components herein may be shown in somewhat schematic form and some details of conventional elements may not be shown in the interest of clarity, explanation, and conciseness. The drawing figures are hereby made part of the specification, written description and teachings disclosed herein.

Glossary

Certain terms are used throughout the following description to refer to particular features, steps, or components, and are used as terms of description and not of limitation. As one skilled in the art will appreciate, different persons may refer to the same feature, step, or component by different names. Components, steps, or features that differ in name but not in structure, function, or action are considered equivalent and not distinguishable, and may be substituted herein without departure from the spirit and scope of this disclosure. The following definitions supplement those set forth elsewhere in this specification. Certain meanings are defined here as intended by the inventors, i.e., they are intrinsic meanings. Other words and phrases used herein take their meaning as consistent with usage as would be apparent to one skilled in the relevant arts. In case of conflict, the present specification, including definitions, will control.

Unless otherwise defined, all technical and scientific terms used herein have the same meaning as commonly understood by one of ordinary skill in the art to which the subject matter described herein belongs. In case of conflict, the present specification, including definitions, will control.

General connection terms including, but not limited to "connected," "attached," "conjoined," "secured," and "affixed" are not meant to be limiting, such that structures so "associated" may have more than one way of being associated. "Fluidly connected" indicates a connection for conveying a fluid therethrough. "Digitally connected" indicates a connection in which digital data may be conveyed therethrough. "Electrically connected" indicates a connection in which units of electrical charge or power are conveyed therethrough.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation. Reference to "one embodiment," "an embodiment," or an "aspect," means that a particular feature, structure, step, combination or characteristic described in connection with the embodiment or aspect is included in at least one realization of the inventive matter disclosed here. Thus, the appearances of the phrases "in one embodiment" or "in an embodiment" in various places throughout this specification are not necessarily all referring to the same embodiment and may apply to multiple embodiments. Furthermore, particular features, structures, or characteristics of the inventive matter may be combined in any suitable manner in one or more embodiments. For example, it is contemplated that features of dependent claims depending from one independent claim can be used in apparatus and/or methods of any of the other independent claims.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure. Aspex Eyewear v Marchon Eyewear 672 F3d 1335, 1349 (Fed Circ 2012). "Configured to", as used here, is taken to indicate is able to, is designed to, and is intended to function in support of the inventive structures, and is thus more stringent than "enabled to".

It should be noted that the terms "may," "can,'" and "might" are used to indicate alternatives and optional features and only should be construed as a limitation if specifically included in the claims. The various components, features, steps, or embodiments thereof are all "preferred" whether or not specifically so indicated. Claims not including a specific limitation should not be construed to include that limitation. For example, the term "a" or "an" as used in the claims does not exclude a plurality.

"Conventional" refers to a term or method designating that which is known and commonly understood in the technology to which this disclosure relates.

Unless the context requires otherwise, throughout the specification and claims that follow, the term "comprise" and variations thereof, such as, "comprises" and "comprising" are to be construed in an open, inclusive sense—as in "including, but not limited to." As used herein, the terms "include" and "comprise" are used synonymously, the terms and variants of which are intended to be construed as non-limiting.

The appended claims are not to be interpreted as including means-plus-function limitations, unless a given claim explicitly evokes the means-plus-function clause of 35 USC § 112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present disclosure.

"Processor" refers to a digital device that accepts information in digital form and manipulates it for a specific result based on a sequence of programmed instructions. Processors are used as parts of digital circuits generally including a clock, random access memory and non-volatile memory (containing programming instructions), and may interface with other digital devices or with analog devices through I/O ports, for example.

"Computer" means a virtual or physical computing machine that accepts information in digital or similar form and manipulates it for a specific result based on a sequence of instructions. "Computing machine" is used in a broad sense, and may include logic circuitry having a processor, programmable memory or firmware, random access memory, and generally one or more ports to I/O devices such as a graphical user interface, a pointer, a keypad, a sensor, imaging circuitry, a radio or wired communications link, and so forth. One or more processors may be integrated into the display, sensor and communications modules of an apparatus of an embodiment, and may communicate with other microprocessors or with a network via wireless or wired connections known to those skilled in the art. Processors are generally supported by static (programmable) and dynamic memory, a timing clock or clocks, and digital input and outputs as well as one or more communications protocols. Computers are frequently formed into networks, and networks of computers may be referred to here by the term "computing machine." In one instance, informal internet networks known in the art as "cloud computing" may be functionally equivalent computing machines, for example.

A "server" refers to a software engine or a computing machine on which that software engine runs, and provides a service or services to a client software program running on the same computer or on other computers distributed over a network. A client software program typically provides a user interface and performs some or all of the processing on data or files received from the server, but the server typically maintains the data and files and processes the data requests. A "client-server model" divides processing between clients and servers, and refers to an architecture of the system that can be co-localized on a single computing machine or can be distributed throughout a network or a cloud.

DETAILED DESCRIPTION

Figure 1A:
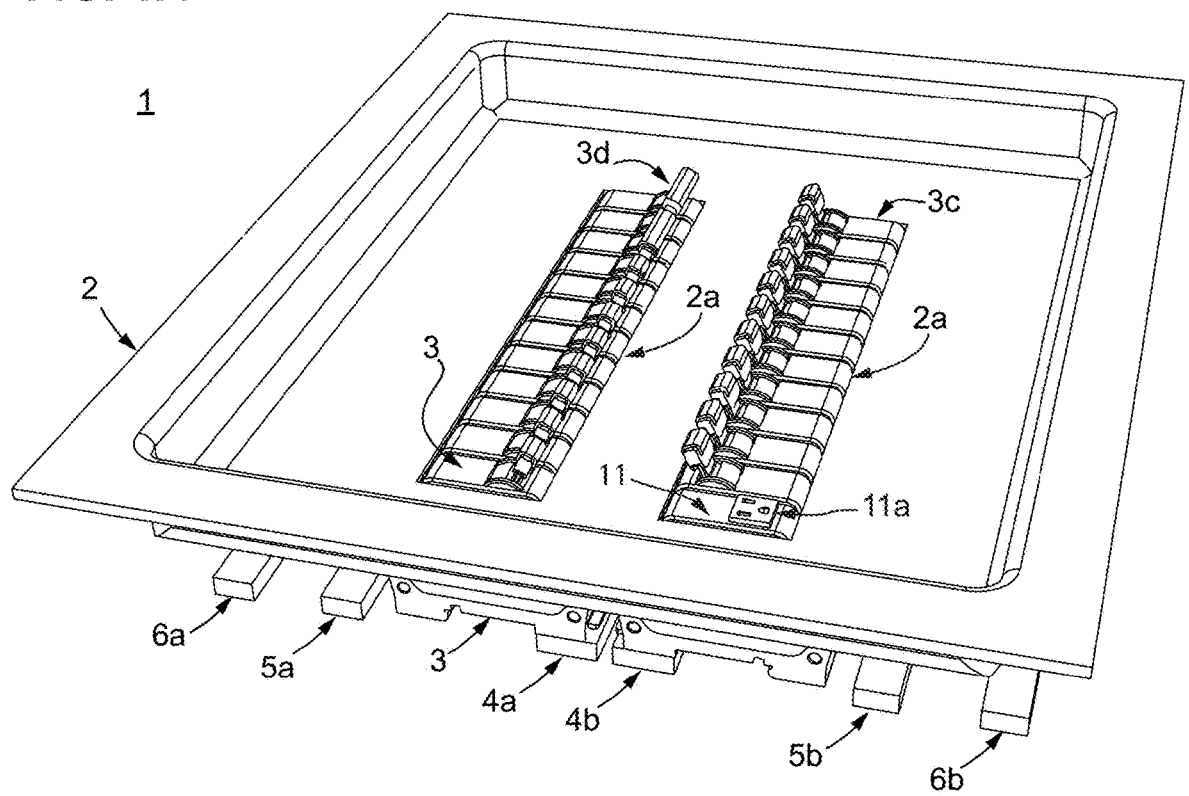
FIG. 1A is view of a first breaker panel that includes a female plug receptacle mounted on the bus bars, shown here as dummy circuit breaker body with a plug receptacle for receiving a pluggable NEMA-type AC extension cord.

FIG. 1A is view of a breaker panel 1 that includes a dummy breaker device 11 with plug receptacle 11a mounted on the bus bars. Shown here is a female plug receptacle 11a for receiving a pluggable AC extension cord that mounts on the bus bars.

The breaker panel 1 includes a dead front cover panel 2. The cover panel is slotted to expose banks of circuit breakers 3. Breaker 3c includes a conventional 120 VAC single-pole switch. Double-breaker 3d includes a 240 VAC double-pole throw switch. Also shown is dummy breaker device 11 with female plug receptacle 11a. The dummy breaker 11 extends under the front cover panel 2 and seats on the "hot" bus bar without making an electrical connection thereto. Not shown are a front panel door and box with backpanel for supporting the hot bus bars 4a,4b, common bus bars 5a,5b (or "neutral"), mains and street wiring. The dual grounds 6a,6b are tied to a single earth ground. The common or "neutral" is tied to a street common AC lead, and the two hot bus bars 4a,4b are supplied with two phases of AC power conventionally wired from "black" and "red" wire street feeds or equivalent as known in the art. The hot bus bars include interdigitated vertical tabs that fit into "slots" with shoe-connectors in the underside of each circuit breaker body. Other styles of breaker panels are known in the art and the invention is generally applicable with adaptations to be used with breaker panels supplied by various manufacturers, each with a different style. Breaker panels for which this invention is useful include panels make by Siemens, Leviton, Square D, General Electric, Cadence, Astrodyne, Berthold, Schneider, Murray and others, while not limited thereto. In the United States, these panels are generally in compliance with accepted standards as tested by Underwriter's Laboratories, Inc. Similar worldwide standards exist. Breaker panels of this kind are intended to be wall mounted, such as in a garage or utility closet against an exterior wall, but may also be mounted in a temporary shelter during construction. The panels are supported by a box-like frame with four walls and a backpanel.

A plug receptacle 11a of this kind is useful for example, in temporarily plugging in a gooseneck lamp, such as when working in a poorly lit garage or closet. The plug receptacle 11a may also be useful in supplying power to cord-operated power tools such as a drill or saw during construction when other circuit outlets are not available. The alternative requires knock-outs on the sides of the breaker panel be removed so that a secondary plug box with plug receptacle can be installed. This is a permanent modification, and may require changes in the structural studs of the supporting framing. A secondary plug box or subpanel may support one or two different plug outlets, but advantageously, dummy plugs of the invention, of which several embodiments are illustrated in the drawings, allow for temporary electrical connections to be made in a "plug and play" mode by which any supported AC configuration, including 120, 240, 480 and various 3-phase combinations are supported by interchangeable modular devices without modification of the breaker panel or external walls.

Figure 1B:
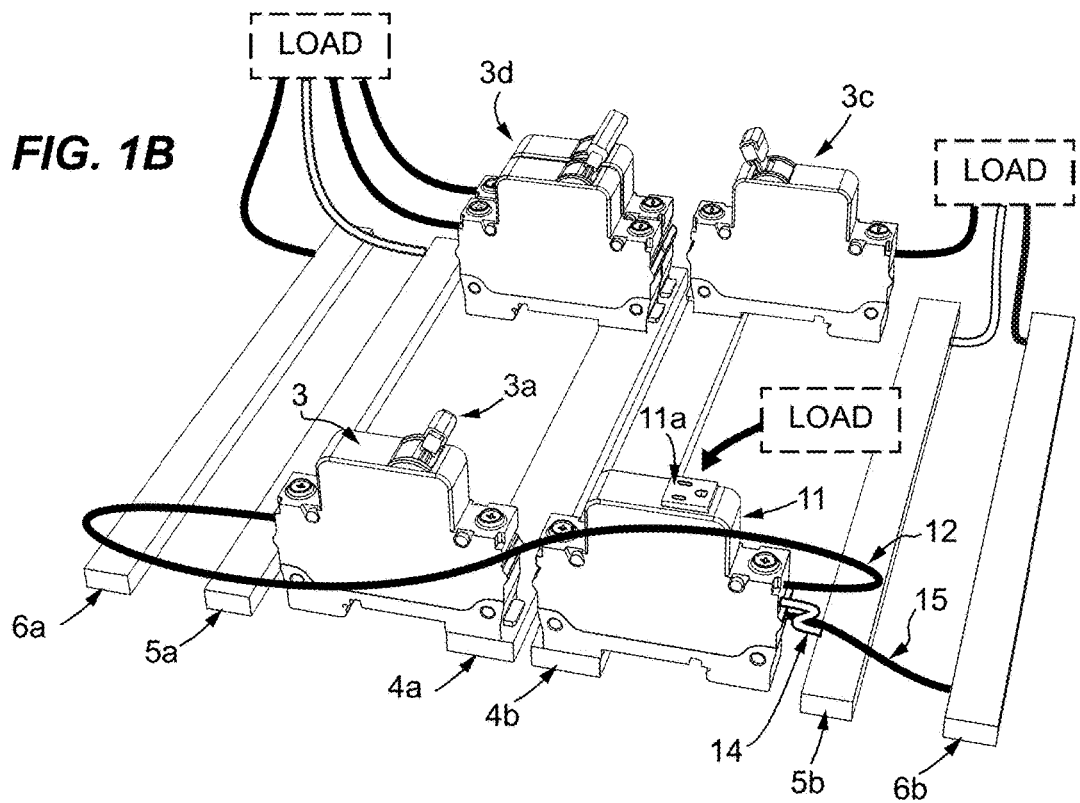
FIG. 1B is a detail view of a dummy breaker device that seats in the breaker panel, the dummy breaker including a female receptacle for receiving a pluggable AC extension cord. Conventional circuit breakers are shown for comparison.

In a first embodiment, FIG. 1B is a detail view of a dummy breaker 11 with receptacle 11a that seats in breaker panel 1. The female receptacle 11a is configured to receive a pluggable AC extension cord to a load (LOAD). The dummy breaker 11 is seated on the hot bus bar 4b with a dummy slot, but is not electrically connected to the hot bus bar. It is wired 14 to the common bus bar 5b. It is also shown 15 to a ground bus bar 6b. Two ground bus bars are shown (6a,6b) for symmetry. To complete the circuit, the dummy breaker 11 is wired 12 in series to a conventional circuit breaker 3 with single pole throw switch 3a. Current flows from hot bus bar 4a through breaker 3, through hot wire 12 to the plug receptacle 11a, and from there to common wire 14 connected (when a load is plugged in) to common bus 5b. No extra connection is made from the breaker 3 to the common or ground bus bar 5a,6a so that the circuit is fully responsive to the current flowing through the plug-in load.

The plug receptacle 11a is capable of forming a closed circuit when the circuit breaker is closed and a plug-in load is connected between the hot outlet and the common outlet of the plug receptacle by the insertion of an external electrical plug into the plug receptacle. In this way, when a live load is plugged into plug receptacle 11a, the load is powered in series with the breaker 3 such that the breaker will trip if there is a circuit overload or fault.

For comparison, breaker 3c is shown wired to a 120 VAC load in a conventional manner. Also shown for comparison, double-breaker 3d is shown wired to a 240 VAC load in a conventional manner. Hot bus bars 4a,4b are conventionally inter-tabbed by some manufacturers so that the "black" and "red" phases may be connected to double breaker units 3d when 240 VAC is needed.

Figure 2A:
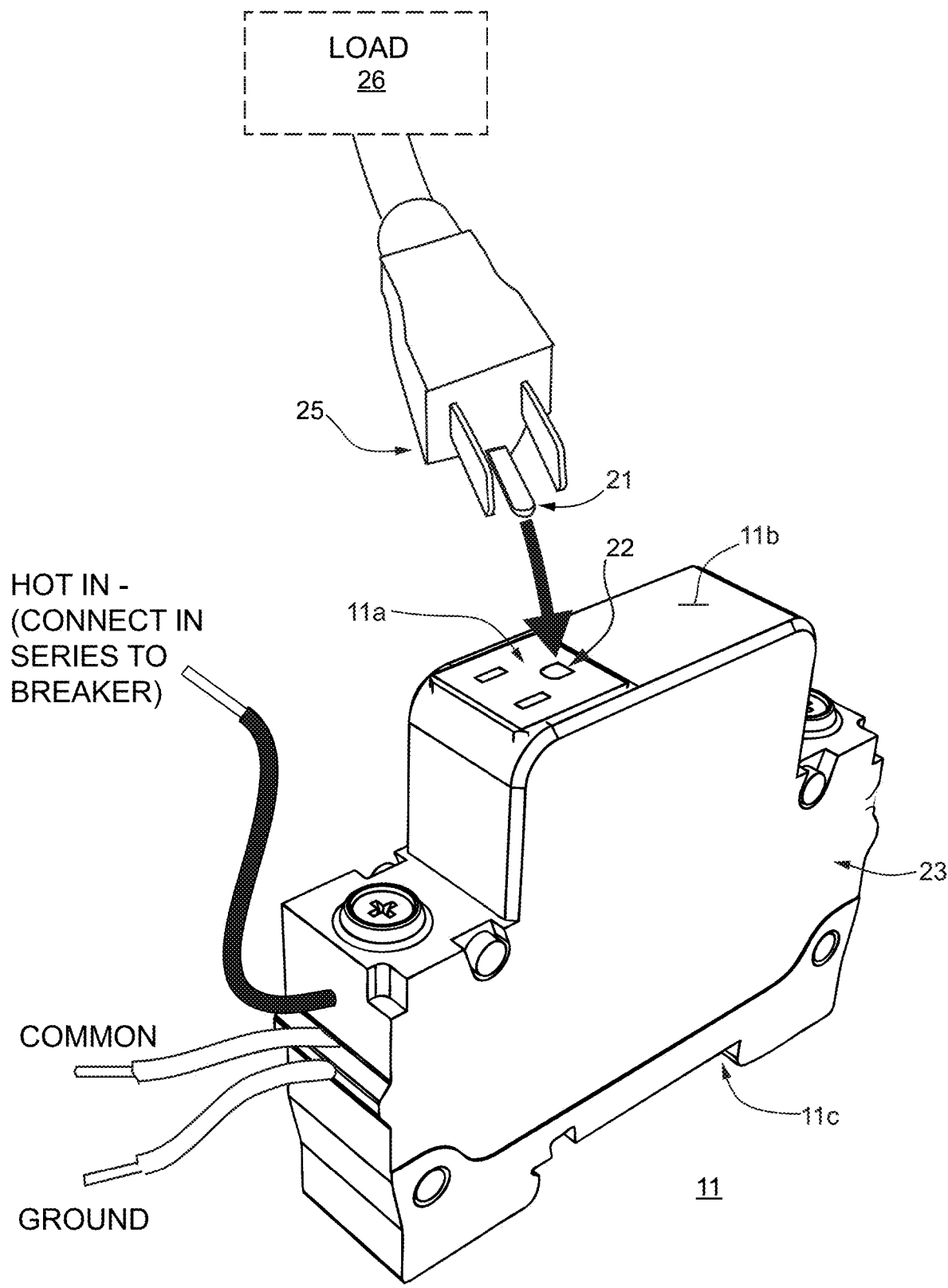
FIG. 2A is a close-up view of a dummy breaker device with plug-in receptacle for receiving an AC plug.

FIG. 2A is a close-up view of a dummy breaker device 11 with plug receptacle 11a for receiving an AC plug 25 that connects to load 26. Device 11 includes an upper surface 11b and an underside surface 11c. The prongs of AC plug 25 insert or "plug in" to the outlets of the plug receptacle 11a on the upper surface 11b of the device body or "housing" 23. Ground prong 21 of AC plug 25 is aligned with ground receptacle 22 of the plug receptacle 11a to make the connection. In this view it can be seen that the body housing 23 of the dummy breaker device 11 includes three external wire leads that connect internally to the outlets of plug receptacle 11a for making external connections to the hot, common and ground of the breaker panel. In this embodiment, the external hot lead connects in series to a conventional circuit breaker 3. The external leads are labelled HOT, COMMON and GROUND. These may be color coded, for example HOT as black, COMMON as white, and GROUND as green. Wires may be braided or solid copper or aluminum, for example, and are sheathed with an insulative layer where exposed.

Figure 6A:
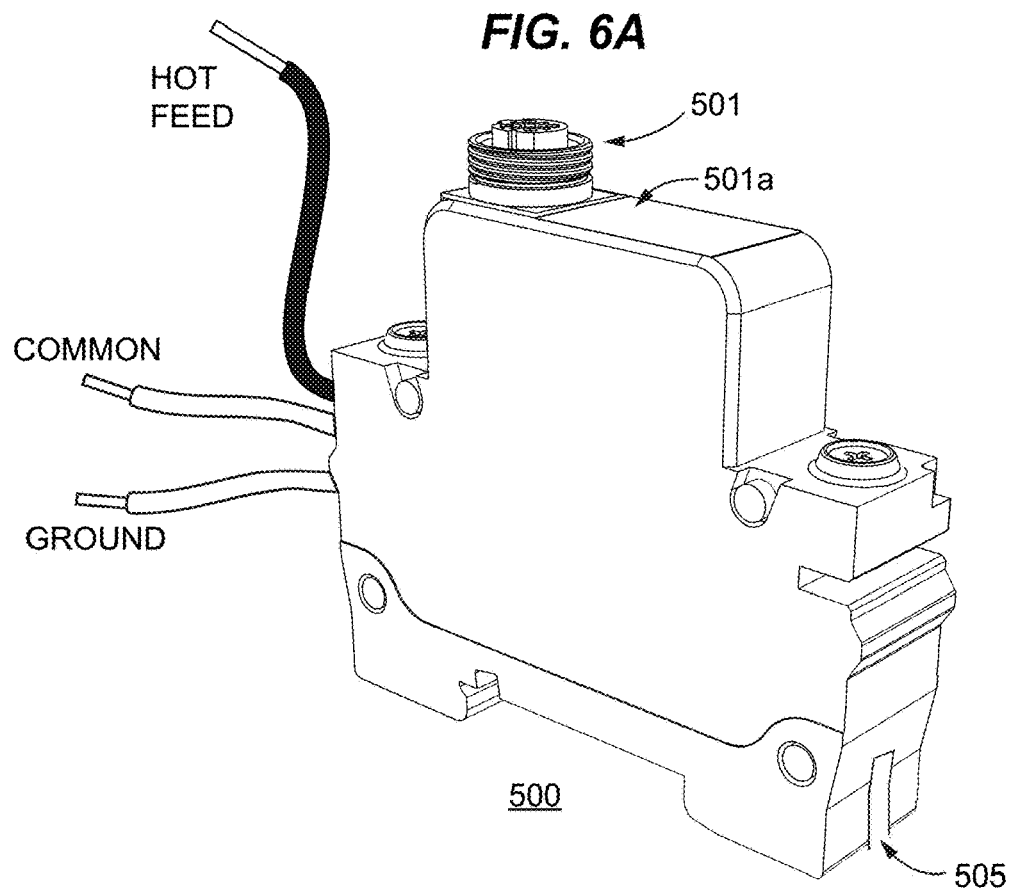
FIG. 6A is a view of a dummy breaker body with aviation plug receptacle fitted for series wiring to a circuit breaker.

The plug receptacle 11a shown is a NEMA-type plug receptacle conforming to the standards set forth by US National Electrical Manufacturers Association. NEMA plug standards exist for all commonly available power configurations in North America. Such standards include NEMA 5/15, 6-50, 14-30 and so forth, as illustrated more comprehensively in FIG. 20. However, the invention is not limited to plugs of this type, and an alternative embodiment is illustrated in FIG. 6A, for example.

Figure 2B:
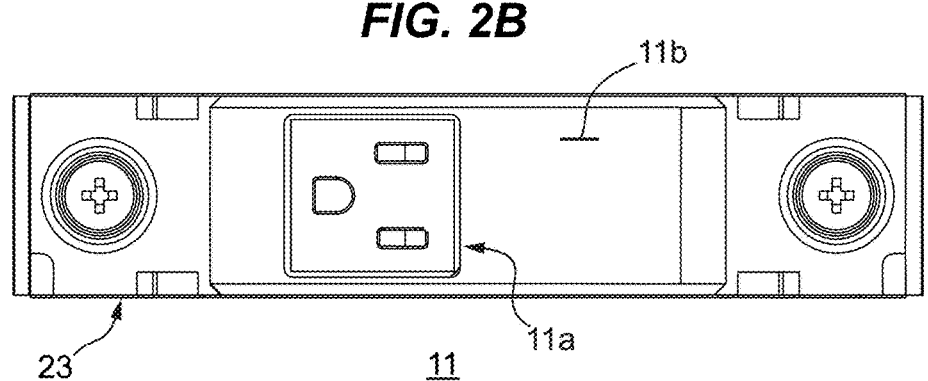
FIGS. 2B and 2C are top and bottom isometric views of the dummy breaker with plug-in receptacle for receiving an AC plug.
Figure 2C:
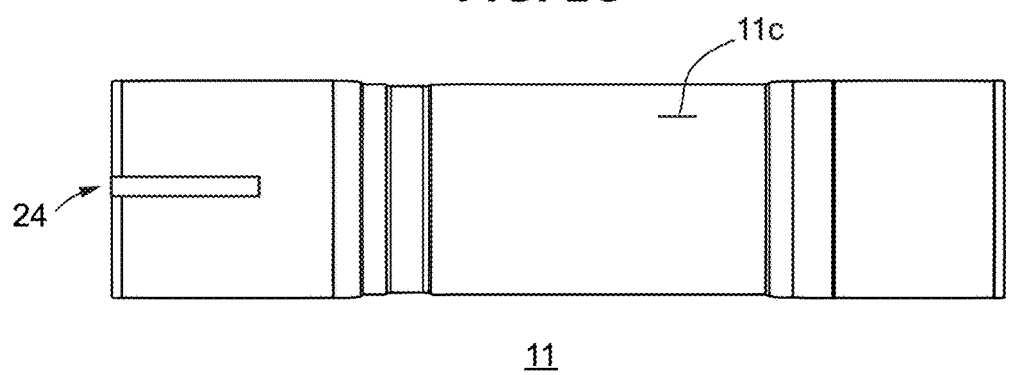

FIGS. 2B and 2C are top and bottom isometric views of the dummy breaker device 11 with plug-in receptacle 11a on the upper surface 11b for receiving an AC-plug. The modular body housing 23 is shaped to mimic a conventional circuit breaker body, and includes a dummy slot 24 on the underside surface 11c for seating on a tab of a hot bus bar without making an electrical connection to the hot bus bar. In some instances the hot tab seats in a toe of the body housing 23, but regardless, the dummy breaker device 11 does not allow a live connection to the hot bus bar.

Figure 3:
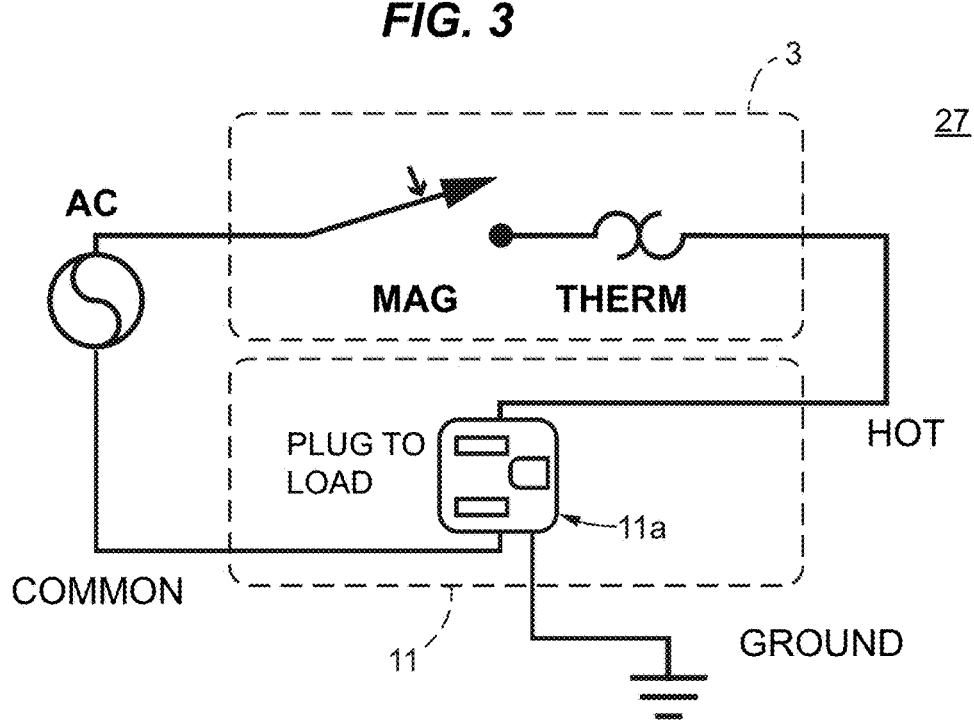
FIG. 3 is a schematic showing the wiring of a dummy breaker device to a circuit breaker with magnetic fuse and thermal fuse, as is compatible with a conventional breaker panel and hot, common and ground rails.

FIG. 3 is a schematic 27 showing the series wiring of a dummy breaker device body 11 to a circuit breaker body 3 (with magnetic fuse and thermal fuse) to an AC circuit. The plug receptacle 11a is embedded in the dummy breaker body with slots for receiving the bayonet prongs of a male plug as shown here, but other types of plug receptacles may also be used. Generally leads are provided for making connections of the HOT, COMMON and GROUND pins of the plug receptacle to external power. In this embodiment, no direct connection is made through the dummy breaker body to the hot bus bar on which the dummy breaker body is mounted. The external leads may be wire leads, for example, of braided copper or aluminum wire core with a strippable insulative cover, for example.

The circuit breaker body 3 is a genuine, fully functional circuit breaker with internal hot shoe for engaging a hot tab of the hot bus bar on an underside toe of the circuit breaker body. Provision is made for engaging a wire lead to the plug receptacle circuit 11a by which hot AC current is fed to a load. The return from the load is received by the common ("neutral") bus bar of the breaker panel. The source AC is typically supplied from a street utility hookup or from a generator.

Each body unit 3,11 is modular and is compatible with a conventional breaker panel and with the hot, common and ground rails of the breaker panel. The two body units can be placed cis-or trans- on the bus bars (i.e., crosswise on the bus bars or stacked side-by-side). Generally the ground connection is made directly from the plug receptacle 11a to the ground strap of the breaker panel. A GFCI (ground fault circuit interrupt) breaker may be substituted in an analogous circuit if desired so that a ground fault condition can be detected and averted.

Figure 4A:
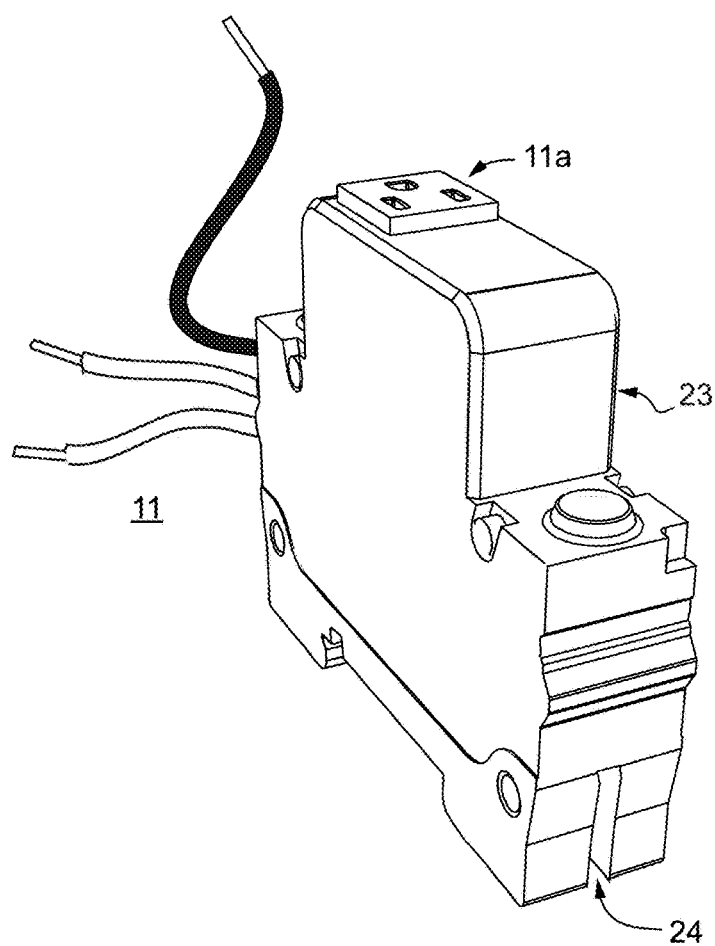
FIGS. 4A and 4B are perspective views of a dummy breaker body with wiring.
Figure 4B:
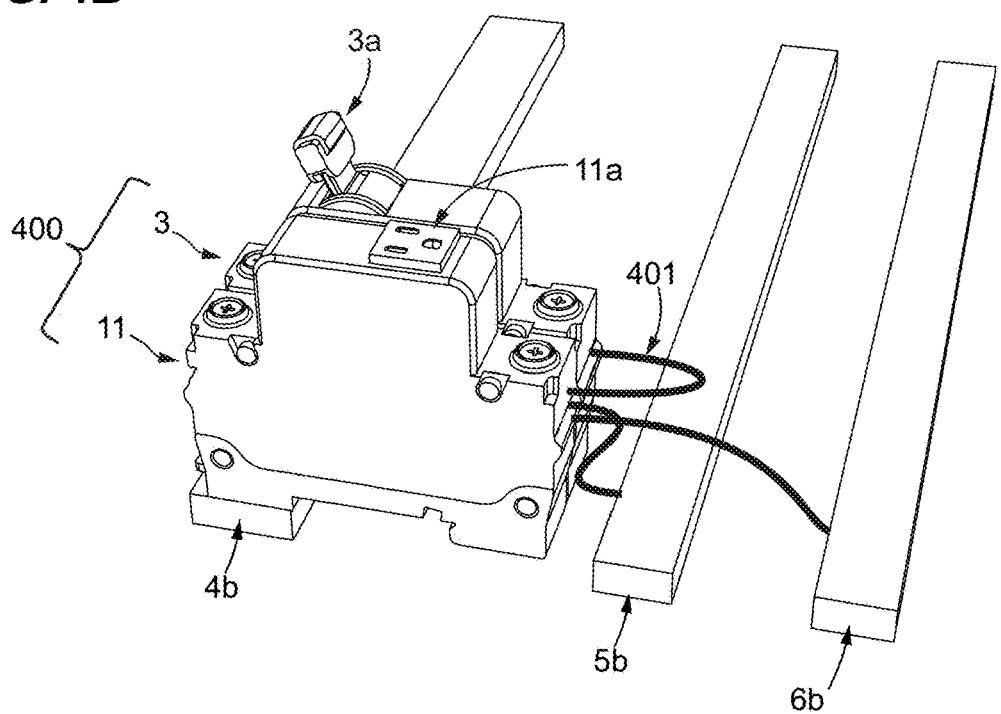

FIG. 4A is a first view of a dummy breaker device 11 with plug receptacle 11a and wiring. Dummy slot 24 is made in body housing 23 so that the unit can insert directly onto the hot bus bar in the breaker panel, but has no active electrical connection. In FIG. 4B the dummy breaker 11 and true breaker 3 are seated side-by-side and are wired in series to a breaker box. Circuit breaker 3 includes single throw pole 3a. Wire 401 connects the dummy breaker plug to the hot bus bar through circuit breaker 3. Direct connections are made from the dummy breaker 11 to the common bus bar 5b and ground 6b to complete the circuit when a plug and live load are inserted into the plug receptacle 11a. Wire 401 connects the hot plug pin of the plug receptacle to the hot bus bar through the circuit breaker body 3.

When side-by-side, the lateral walls of the two modular body units 3,11 are in close contact or are stacked. In another embodiment, the dummy breaker 11 and circuit breaker 3 can be provided as a paired unit 400 having two halves for convenience and may be pre-wired for simplified hookup. The two parts of circuit breaker/plug receptacle unit 400 may share a single ground strap.

Figure 5A:
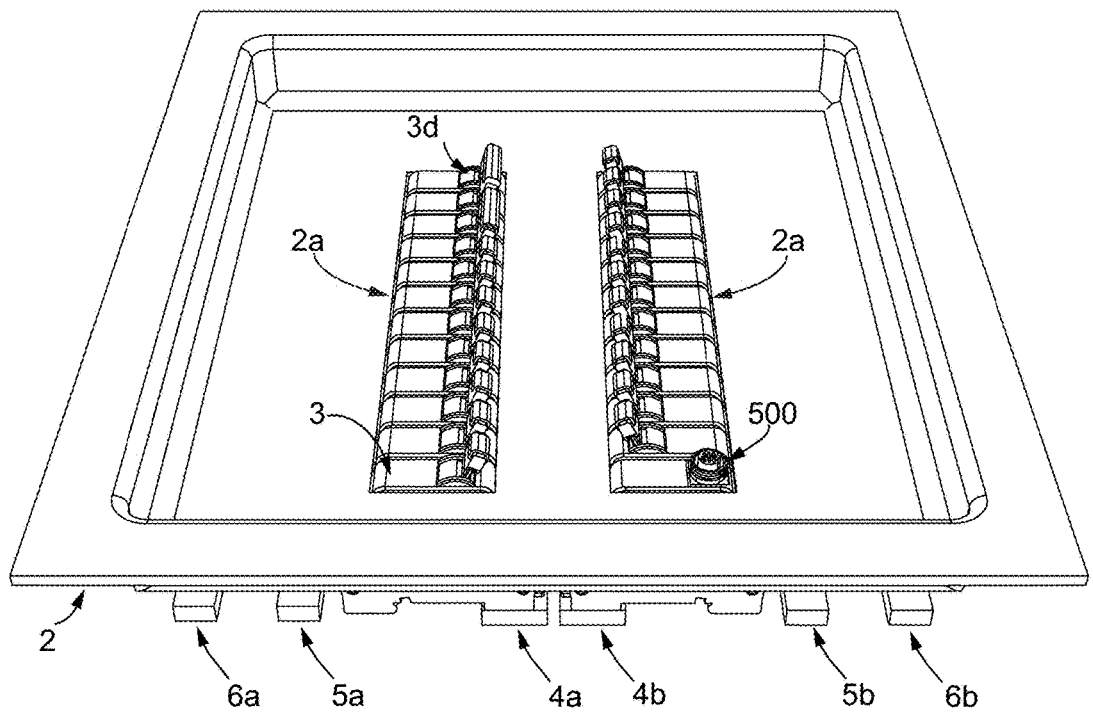
FIG. 5A is a view of a second breaker panel that includes a circuit breaker/plug receptacle, shown here as a female plug receptacle for receiving a pluggable aviation-type extension cord in a dummy breaker body in series with a circuit breaker. Both the dummy breaker body and the circuit breaker share a common modular body form.

FIG. 5A is a view of a second breaker panel that includes a dummy breaker body 500 with AC plug receptacle 501, shown here as a female plug receptacle for receiving a pluggable aviation-type extension cord in series with a circuit breaker. Arrayed in cutouts in the front panel 2 are example circuit breakers 3,3d. A conventional 120 VAC breaker 3 and a 240 VAC double-throw breaker 3d are illustrated. Also illustrated figuratively are hot bus bars 4a,4b, common bus bars 5a,5b and paired ground bus bars 6a,6b. Dummy breaker 500 includes an aviation-type circular plug receptacle 501 (FIG. 5B) configured to receive a mating plug for making an electrical connection.

Figure 5B:
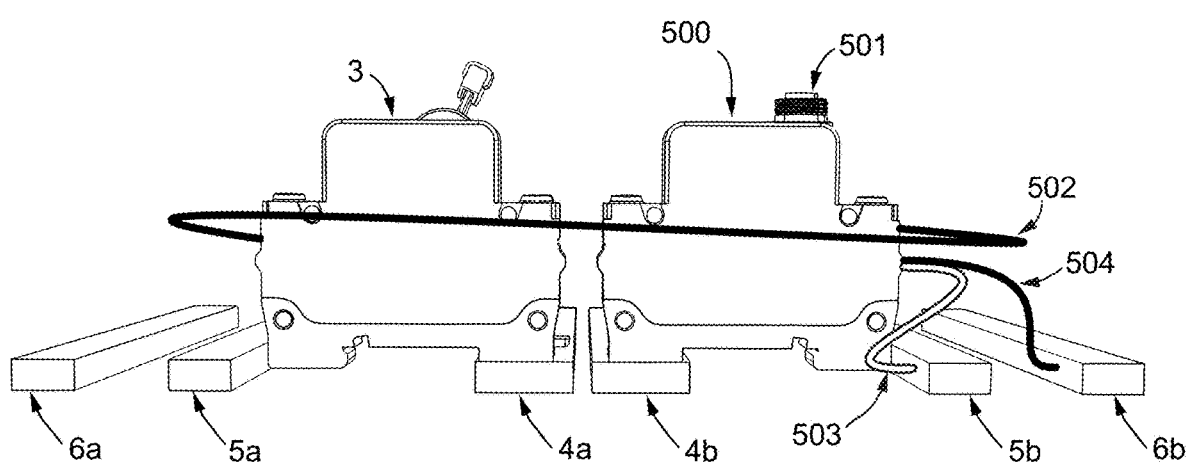
FIG. 5B shows a dummy breaker body/aviation plug receptacle wired in series with a genuine circuit breaker.

FIG. 5B shows a first embodiment of a breaker body/ aviation plug receptacle 500, as is useful with a conventional circuit breaker 3 in series. The plug receptacle 501 is surface-mounted in the dummy breaker body 500 and includes a dummy slot without hot shoe for electrically connecting to the hot bus bar on which the body rests. Instead the dummy slot 505 (FIG. 6A) acts to support the dummy breaker body on the bus bar, but the hot feed is wired from an adjoining circuit breaker 3 via wire lead 502. The hot lead 502 from the dummy breaker body 500 is wired to a genuine circuit breaker 3, which inserts onto a tab of hot bus bar 4a (or 4b, depending on whether the orientation is a cis- or trans-mounted breaker). The dummy breaker body includes a wire 503 for connecting to the common (neutral) bus bar 5b and a ground wire 504 for connecting to ground strap 6b. In this way, when a live load is plugged into plug receptacle 501, the load is powered in series with the breaker 3 such that the breaker will trip if there is a circuit overload or fault.

FIG. 6A is a detail view of a dummy breaker device 500 with aviation plug receptacle on the upper surface 501a fitted for series wiring to a circuit breaker. The aviation plug receptacle 501 is circular and is threaded to receive a male plug with threaded outer sleeve and 4-pin prongs. The dummy breaker body includes a dummy slot 505 that does not have a hot shoe and seats on the hot bus bar but does not electrically connect to the hot bus bar.

Figure 6B:
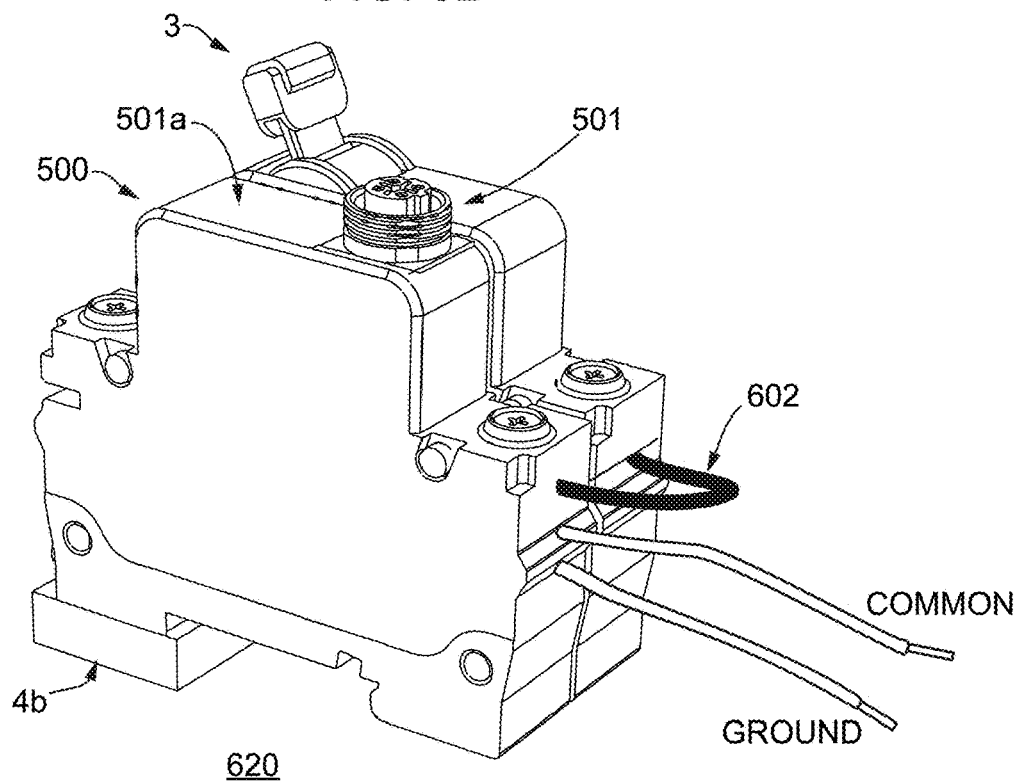
FIG. 6B shows a dummy breaker body with aviation plug receptacle in series with a circuit breaker.

FIG. 6B shows a dummy aviation plug receptacle 500 in series with a circuit breaker 3 that is cis-mounted on an adjoining hot bus bar tab. By placing the circuit breaker in a side-by-side position next to the dummy breaker with plug receptacle, hot wire 602 in series is a shorter connection than shown in FIG. 5B (wire 502). In one embodiment, the dummy breaker and the circuit breaker are supplied separately and are subject to different standards. The two parts may be separable and wired in series as a head-to-head pair as shown in FIG. 5B or as a side-by-side pair shown in FIG. 6B. Conventional circuit breaker 3 is used without modification by wiring it to the adjoining dummy breaker body 500 (as shown, wire 602) instead of to a wire harness directly from a load.

The plug receptacle 501 is capable of forming a closed circuit when the circuit breaker is closed and a load is connected between the hot outlet and the common outlet of the plug receptacle by the insertion of an external electrical plug into the plug receptacle.

The plug receptacle 501 is live when the single-pole throw breaker bar of circuit breaker 3 is in the live position, and if the breaker is tripped, the plug receptacle is disabled. The breaker can include a magnetic interrupt to trip if there is a circuit short, a thermal interrupt to prevent overheating, and may also include a ground fault interrupt.

In another embodiment, the dummy breaker and circuit breaker may be supplied as a single unit and pre-wired in series for convenience. Wire 602 may be looped as shown in the paired body 620, for example. External leads to common and ground connections are also supplied. The paired body will include two slots, one a dummy slot as part of the dummy breaker body 500, and the other a slot with hot shoe as part of the circuit breaker assembly 3. The hot shoe of circuit breaker 3 of combination breaker/plug unit 620 is engaged on a hot tab of hot bus bar 4b as shown.

FIG. 7 is a view of an adaptor 700 with AC plug and a male aviation-type fitting that plugs into an aviation-type plug receptacle 501 of a dummy breaker 500 wired in series with an AC circuit breaker 3. In this instance, the dummy breaker and circuit breaker are paired as a functional unit 620 and insert onto the hot breaker bar in combination. Wiring for conventional attachment to the ground and common bus bars is supplied.

The short adaptor 700 may be one of a set for use with the breaker/plug unit 620. The adaptor includes a plug head 701 for receiving a power cord from an appliance or load, and a plug 703 with threaded sleeve 703a for engaging the plug receptacle 501 of the dummy breaker body 500. Alternate adaptors may include alternate plug heads 701. The adaptors and plug receptacles may include keyways to ensure compatibility. Each breaker/plug unit 620 may be specified according to the kind of electrical connections it can make. Swapping out different dummy breaker devices 500 allows one circuit breaker 3 to be used to protect a variety of plug connections.

Figure 8:
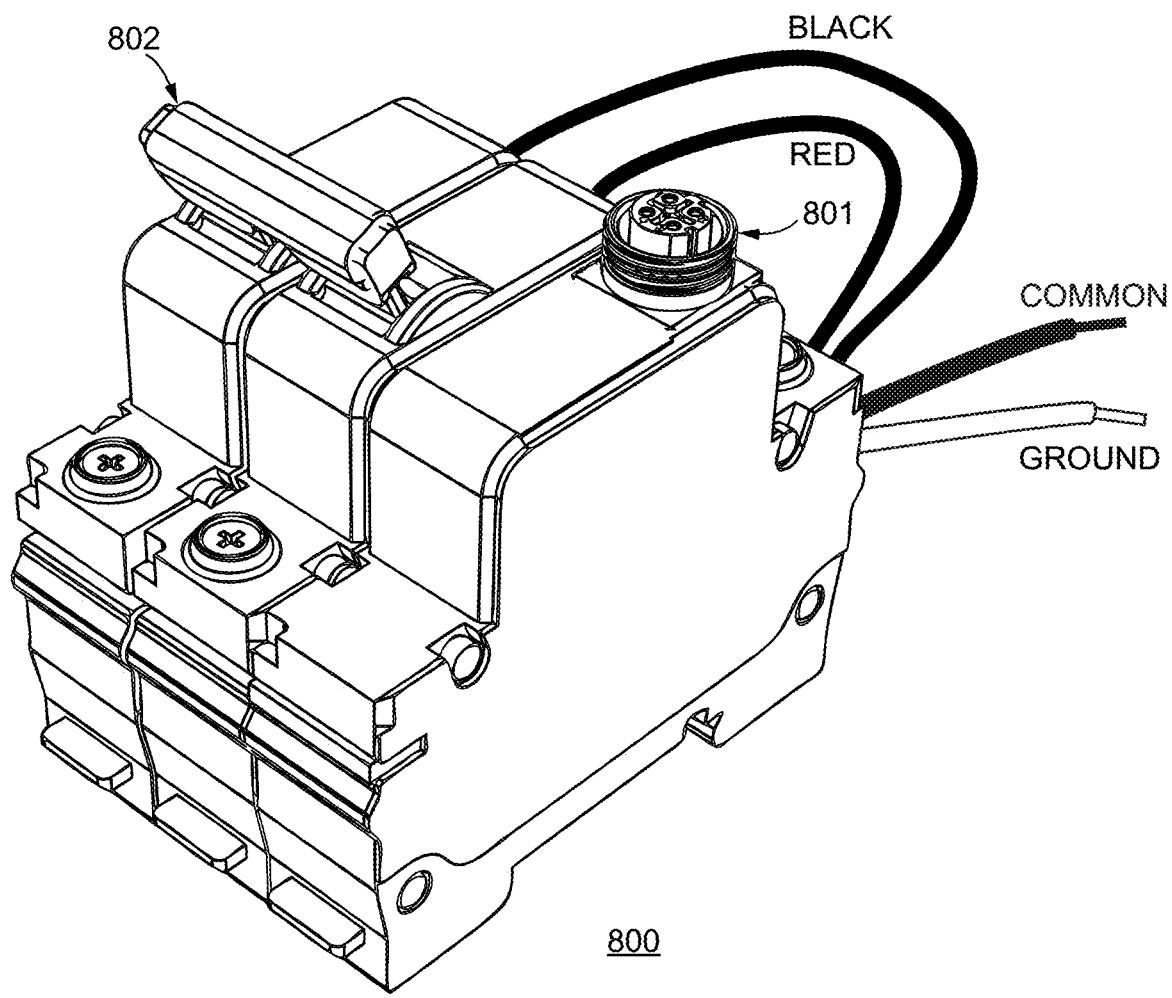
FIG. 8 is a view of a 240 VAC plug assembly with two circuit breakers, double throw pole and series wiring to a dummy breaker with aviation-type receptacle.

FIG. 8 is a view of a 240 VAC breaker/plug assembly 800 with two circuit breakers and double throw pole 802 and series wiring to an aviation-type receptacle 801. Wiring for the common and ground is also provided. The three breaker/plug body modules are configured to insert onto hot tabs of the hot bus bar, with the exception that the dummy plug body is not directly wired, but instead is hot-wired via the BLACK and RED leads shown here and a double pole throw switch 802 is installed. This ensures that the circuit breaker elements function exactly as conventional circuit breaker elements.

Figure 9A:
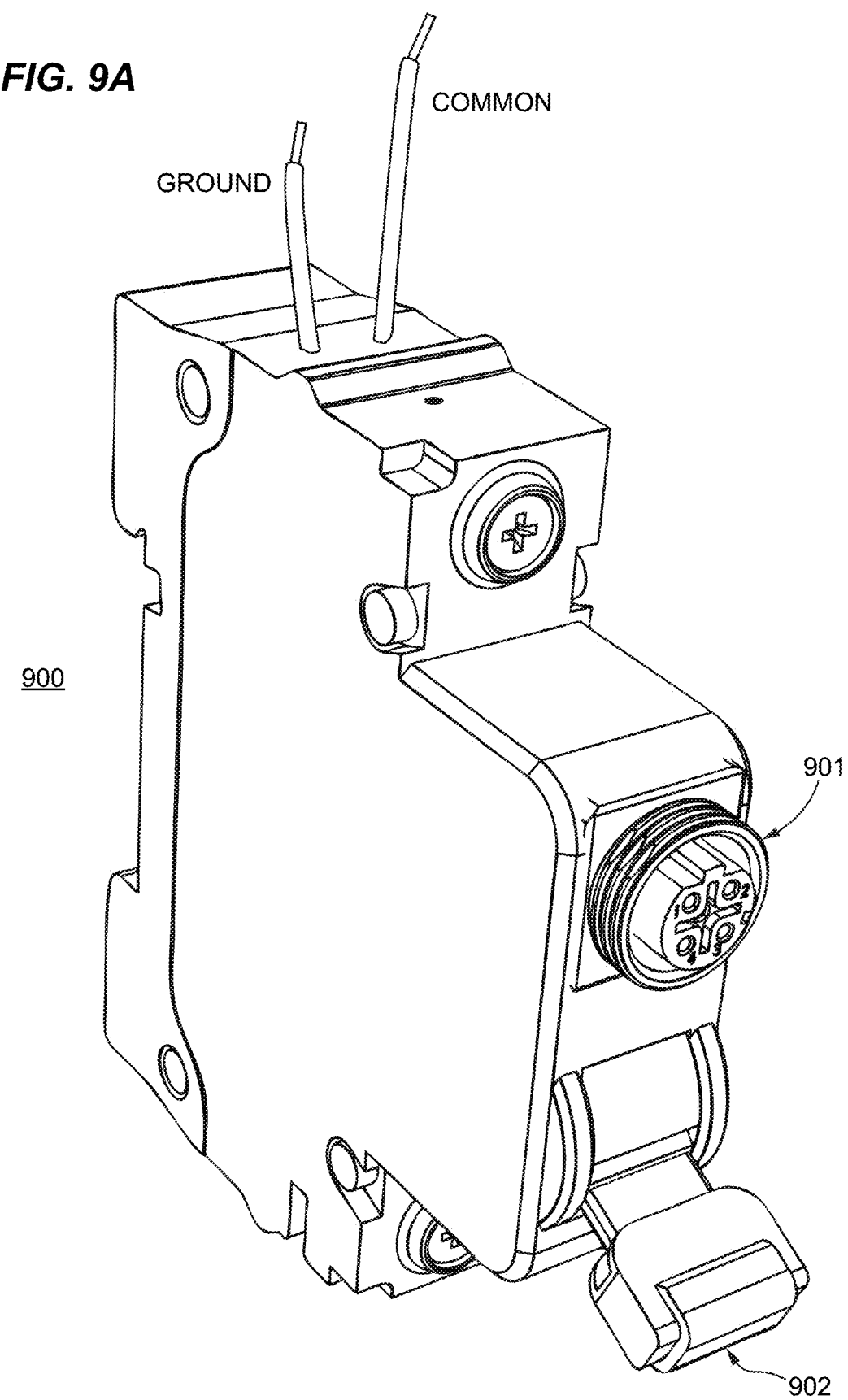
Figure 9B:
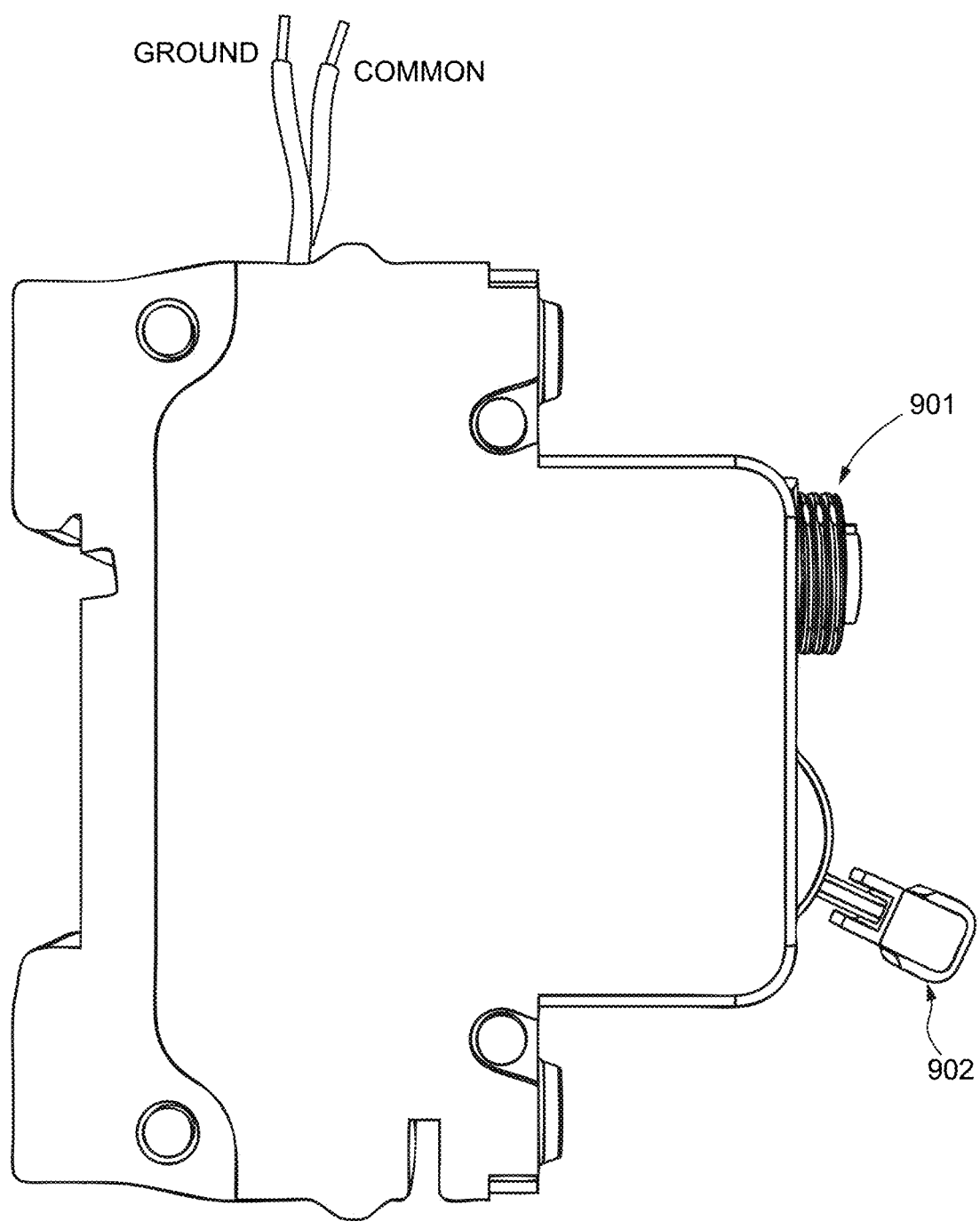
Figure 9C:
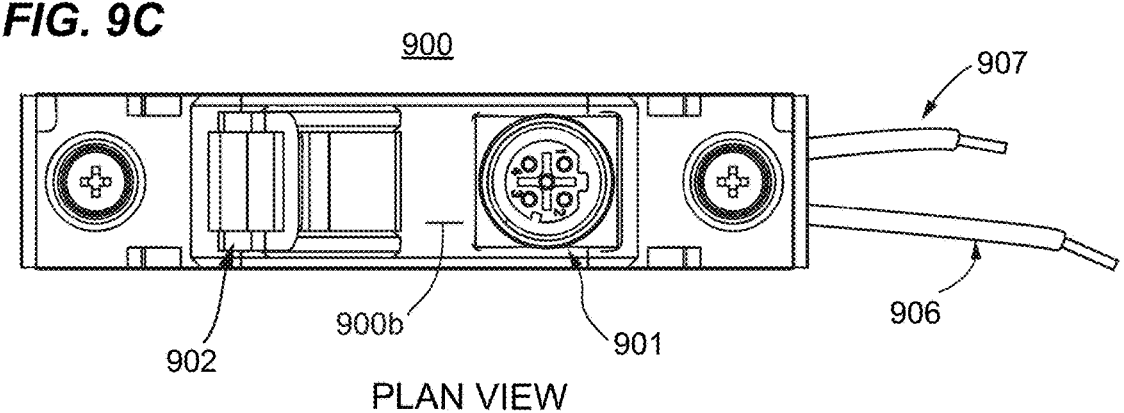

FIGS. 9A, 9B, 9C, 9D, 9E and 9F are isometric and perspective views of a circuit breaker/plug body 900 with plug receptacle 901. In this embodiment, the breaker and plug elements are incorporated as a combination in a single body unit having the modular dimensions of a circuit breaker body. Wiring is supplied for making common and ground connections to the common bus bar and ground strap of the breaker panel. A hot shoe (903a, FIG. 9D) is provided in the base of the breaker body for connecting to the hot bus bar. The perspective view of FIG. 9A shows a single throw circuit breaker pole 902 specified for 120 VAC. The circular aviation-type plug receptacle 901 is intended for use with an adaptor 700 such as shown in FIG. 7 that can come in various configurations. FIGS. 9B and 9C are elevation and plan views of the combination breaker/plug 900. While not shown, the top face 900b of the breaker/plug combination may include an LED or LEDs that act as indicators of circuit status, for example a fault indicator or a live power indicator, if desired. A surface-mounted LED also assists in providing minimal illumination of the plug-receptacle so as to assist when installing a plug under poor lighting conditions.

Figure 9D:
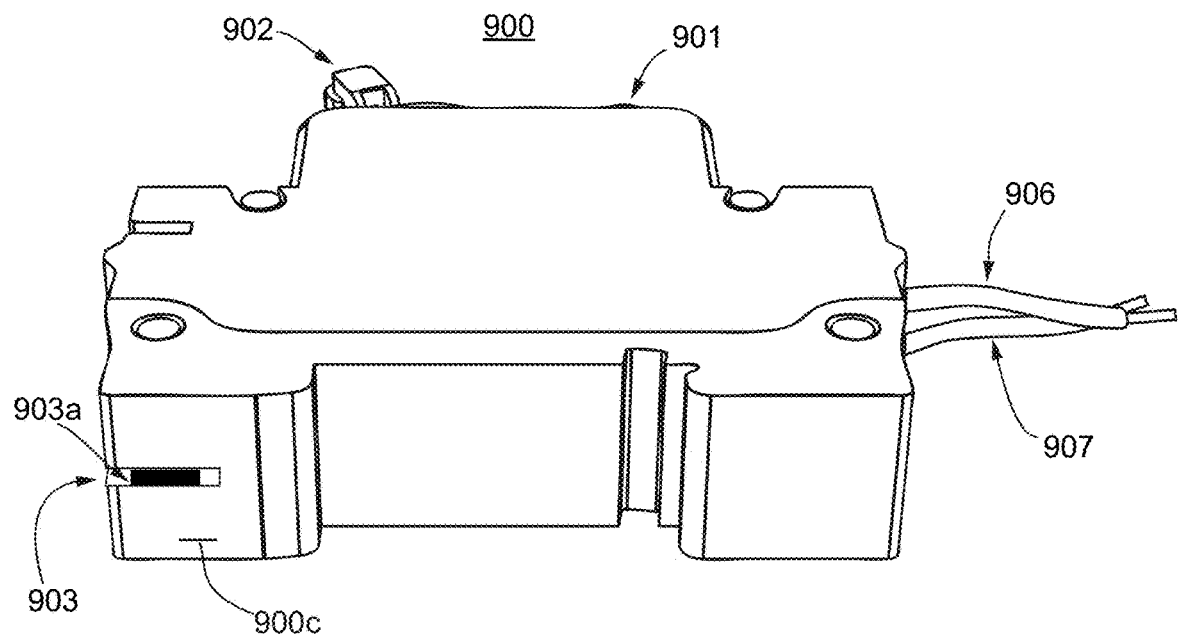

FIG. 9D is an underside perspective view of the combination breaker/plug 900 showing the underside surface 900c of the device body, and illustrates slot 903 that contains a hot shoe 903a for making a connection to a hot tab of a hot bus bar 4a or 4b of the breaker panel. Current flows from the hot shoe 903a, through the breaker with single-throw pole 902, and to the plug receptacle 901 (FIGS. 9C, 9B), such that when a load is connected, the circuit is completed through the external common lead 906 to common bus bar 5a or 5b of the breaker panel. These plugs also typically come with a ground lead 907 for external connection to electrical ground and may be GFCI-certified if desired. The switch pole 902 may be tripped manually to cut power to the plug receptacle, or may be tripped automatically if there is a circuit overload or fault.

FIGS. 9E and 9F are front and back end views of the combination breaker/plug 900 with plug receptacle 901, single-throw pole 902, and illustrate the hot shoe 903a in a slot 903 on the front 900d of the body and external ground and common wires 906,907 on the back end 900e of the body.

Figure 10:
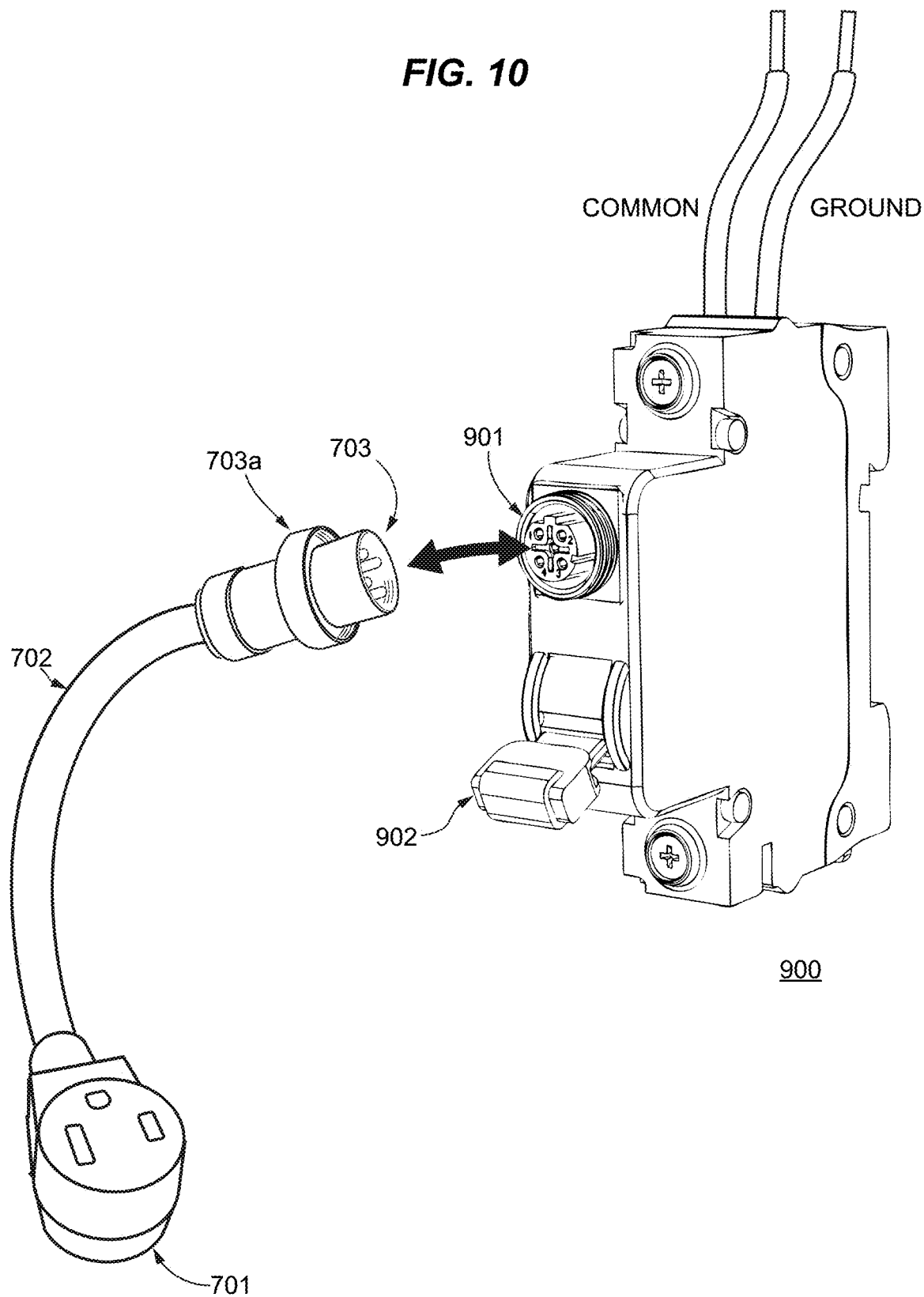
FIG. 10 shows the combination circuit breaker/plug body in a context of use; here with an adaptor cord that converts a 4-pin male plug to a female NEMA 5-15 receptacle.

FIG. 10 shows a circuit breaker/plug combination body 900 in a context of use; here with an adaptor cord 702 that adapts a 4-pin male plug 901 to a female NEMA 5-15 receptacle 701. The breaker/plug combination includes a single-throw switch 902 that is tripped if there is a circuit overload or fault. The body 900 includes a hot shoe that seats on a hot tab of a hot bus bar and two external wires, one to the common bus bar and one to ground. The plug receptacle 901 is fully grounded.

Figure 11A:
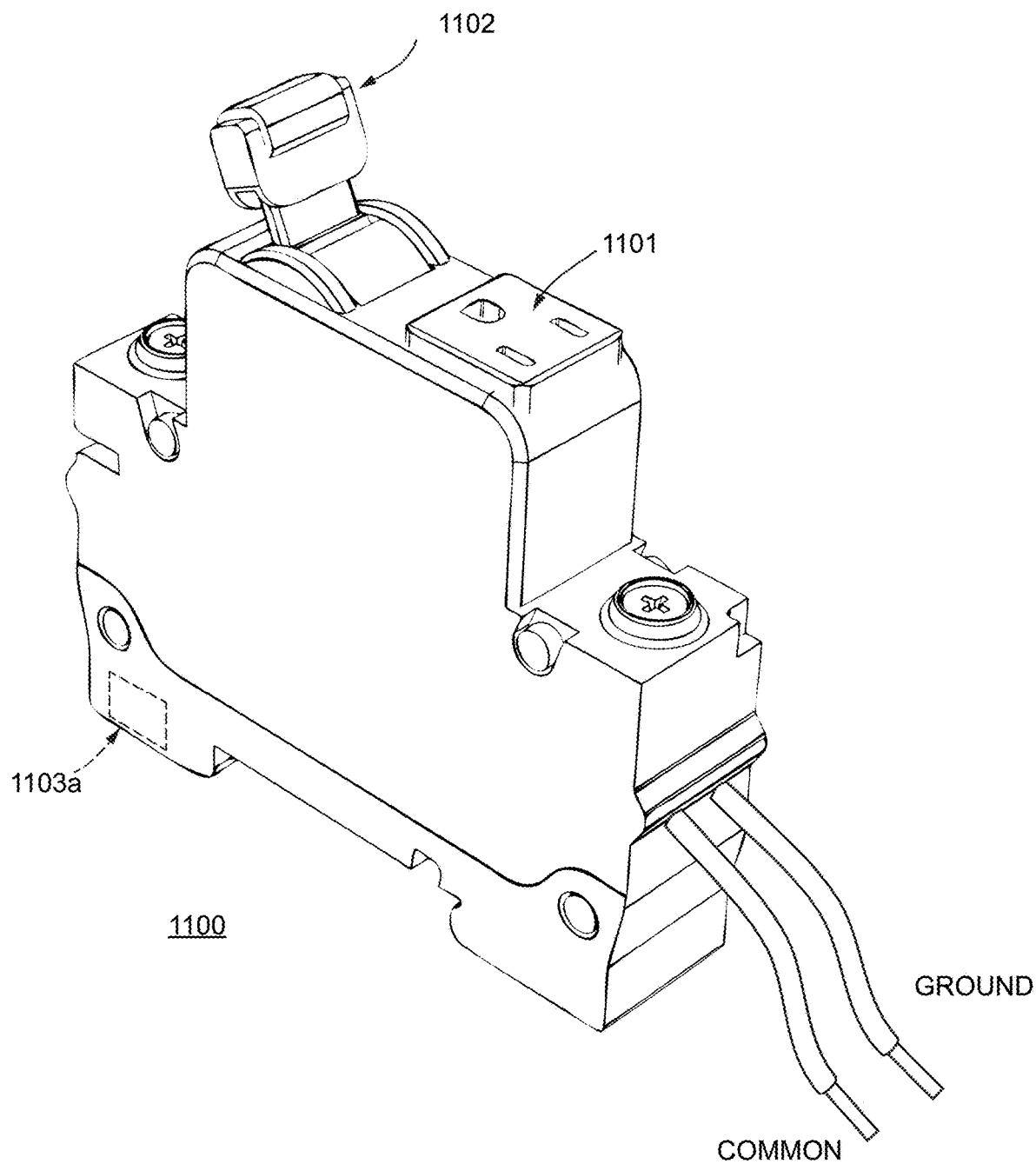
Figure 11D:
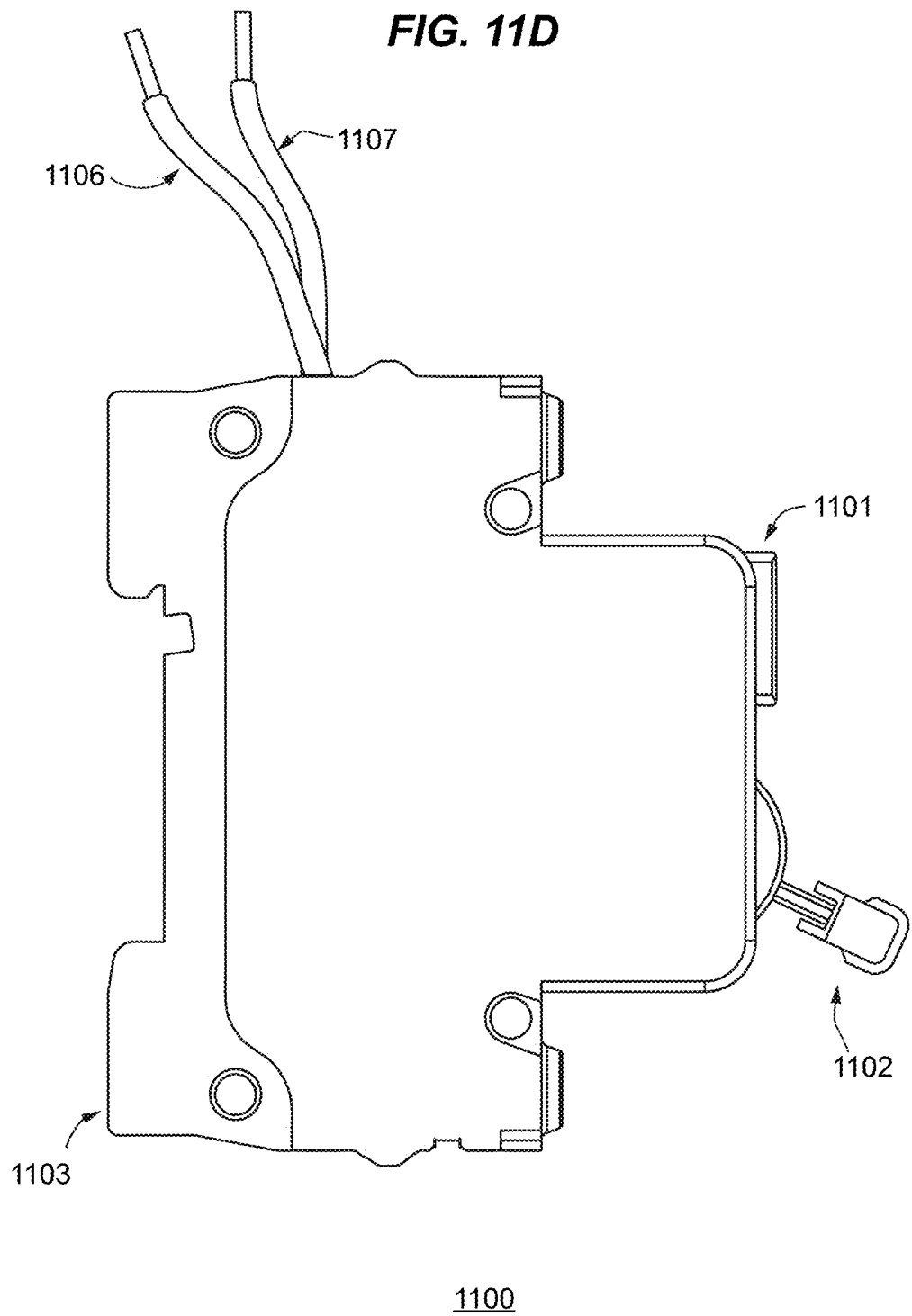

FIGS. 11A, 11B, 11C, and 11D are isometric and perspective views of a circuit breaker/plug body 1100 with 120 VAC NEMA 15-5 plug receptacle 1101 and single throw pole 1102. The body may also be configured to support a GFCI receptacle standard if desired. Two external wires are supplied, one to the common bus bar and one to ground. The hot shoe 1103a (in slot 1103) that seats on the hot bus bar is connected internally to the plug receptacle 1101. FIGS. 11B and 11C show plan and end views respectively. FIG. 11D is a side elevation view showing external wires for common 1106 and ground 1107 connections.

FIG. 12 illustrates the combination circuit breaker/plug body 1100 in a context of use; here with a standard NEMA-Type plug 1250 with bayonet prongs 1250a and cord that inserts into the female NEMA 5-15 receptacle 1101 on the plug body. For reference, the cord is indicated to be connected to a load. The combination circuit breaker/plug body 1100 enables use of a live breaker panel for temporary attachments of tools, for example, while not limited thereto, without the need to have a wall-mounted hard-wired receptacle within reach of the tool cord. The rigid plug 1250, when mounted in plug receptacle 1101, does not interfere with operation of the single-throw pole 1102. As installed, when not in use, the combination circuit breaker/plug body 1100 does not interfere with closure of the breaker panel front panel door.

Figure 13:
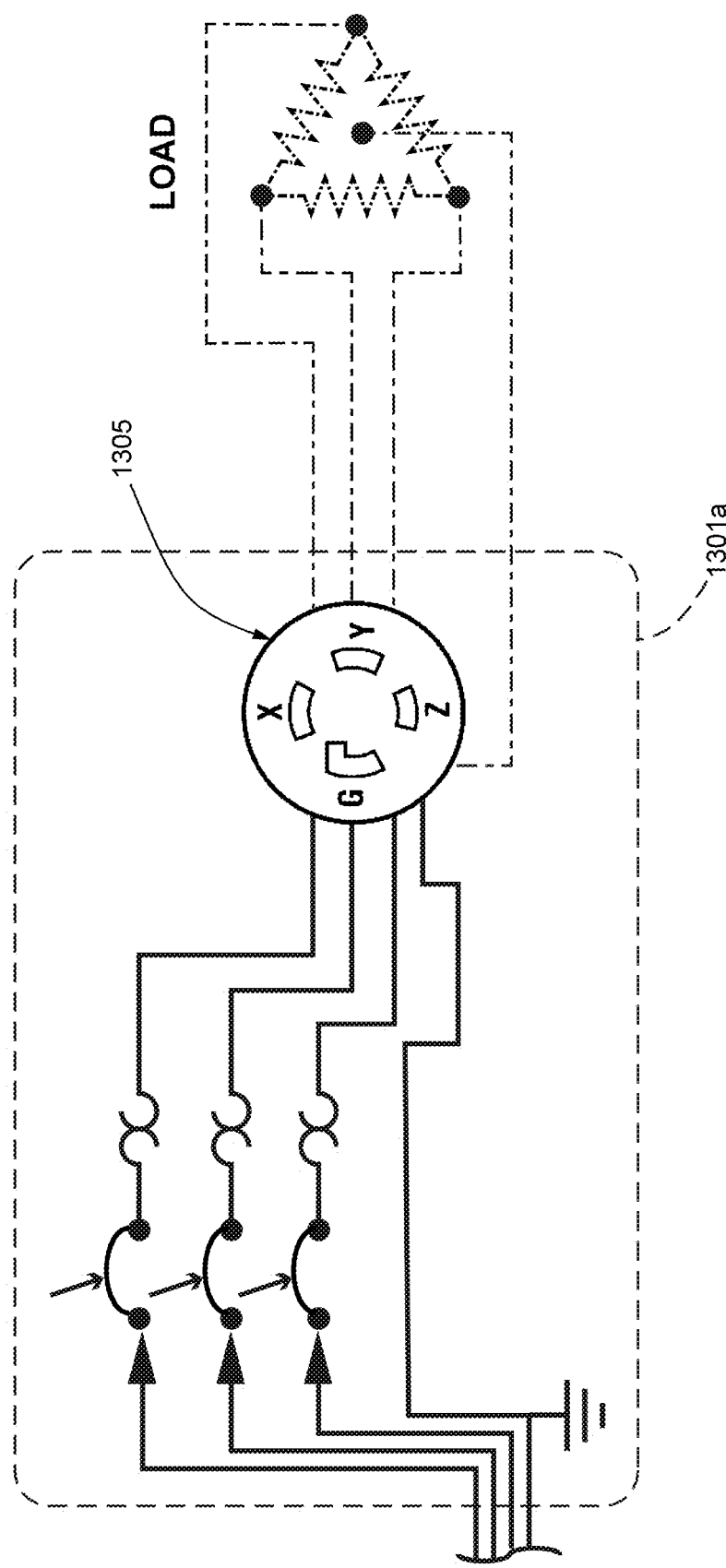
FIG. 13 is a schematic of a circuit breaker/plug device wired for 3-phase applications.

FIG. 13 is a schematic of a circuit breaker plug 1301a configured for 3-phase applications. Each of the phases is provided with a separate fuse. A 3-phase load is shown for reference. The breaker plug assembly 1301a, shown here schematically, is wired with a common return line that includes a ground. As shown here, the plug receptacle is a NEMA L21-30P receptacle 1305. Three-phase power has the advantage of supplying greater torque to motors, for example. This device is configured to be mounted directly within a breaker panel with exposed plug surface.

In another embodiment, the combination circuit breaker/plug body includes a single NEMA L16-30R for receiving a mating NEMA L16-30P plug (not shown). The device is suitable for temporary use and may be removably clipped into a breaker panel by a homeowner or tradesman without the need to install wall-mounted plug boxes on the breaker panel. In some instances the poles of the circuit breaker will be engaged on an existing 240 VAC station in the breaker panel and will combine a third 120 VAC pole. All the wiring may be powered by a single feed from an offsite mains that supplies power from an electric grid or from a generator, for example.

FIG. 14 is a schematic showing a 480 VAC circuit breaker plug receptacle 1400 and wiring. Two 3-phase power schema are commonly available in the United States: 240 VAC and 480 VAC. 480 VAC is more commonly found in industrial and commercial settings. In this instance, the body of the breaker/plug combination includes a NEMA 16-20P receptacle 1401 of traditional wiring, but a threaded aviation circular connector may also be used. A system of keyways may be used to identify compatible plugs and to ensure that pin wiring is correctly mated across the connector. While not bound by theory, the circuit breaker/plug devices may be adapted for multiphase AC configurations at higher voltage drops without departure from the spirit of the inventive concepts.

Figure 15A:
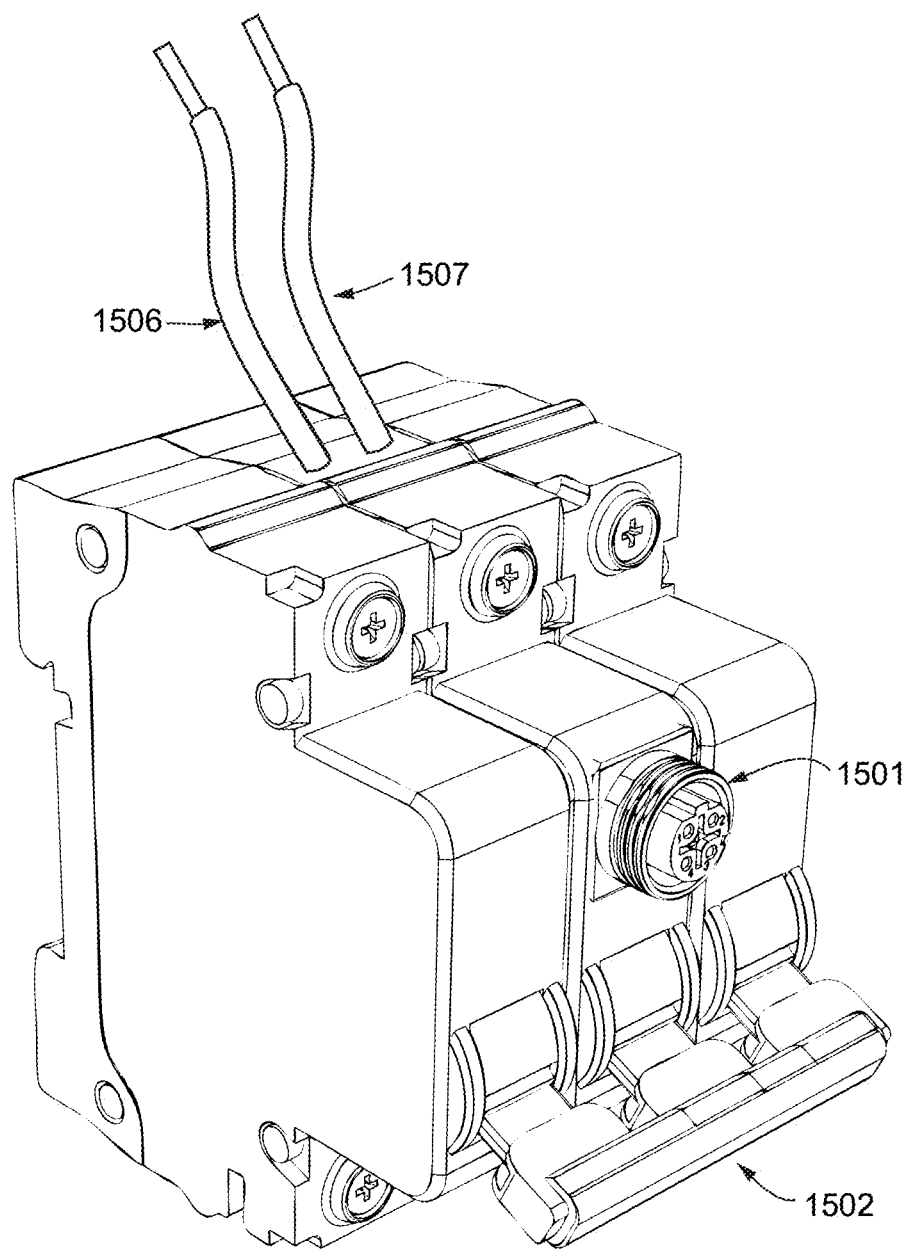
FIGS. 15A and 15B are perspective and plan views, respectively, of a 240 VAC 3-phase circuit breaker/plug assembly.
Figure 15B:
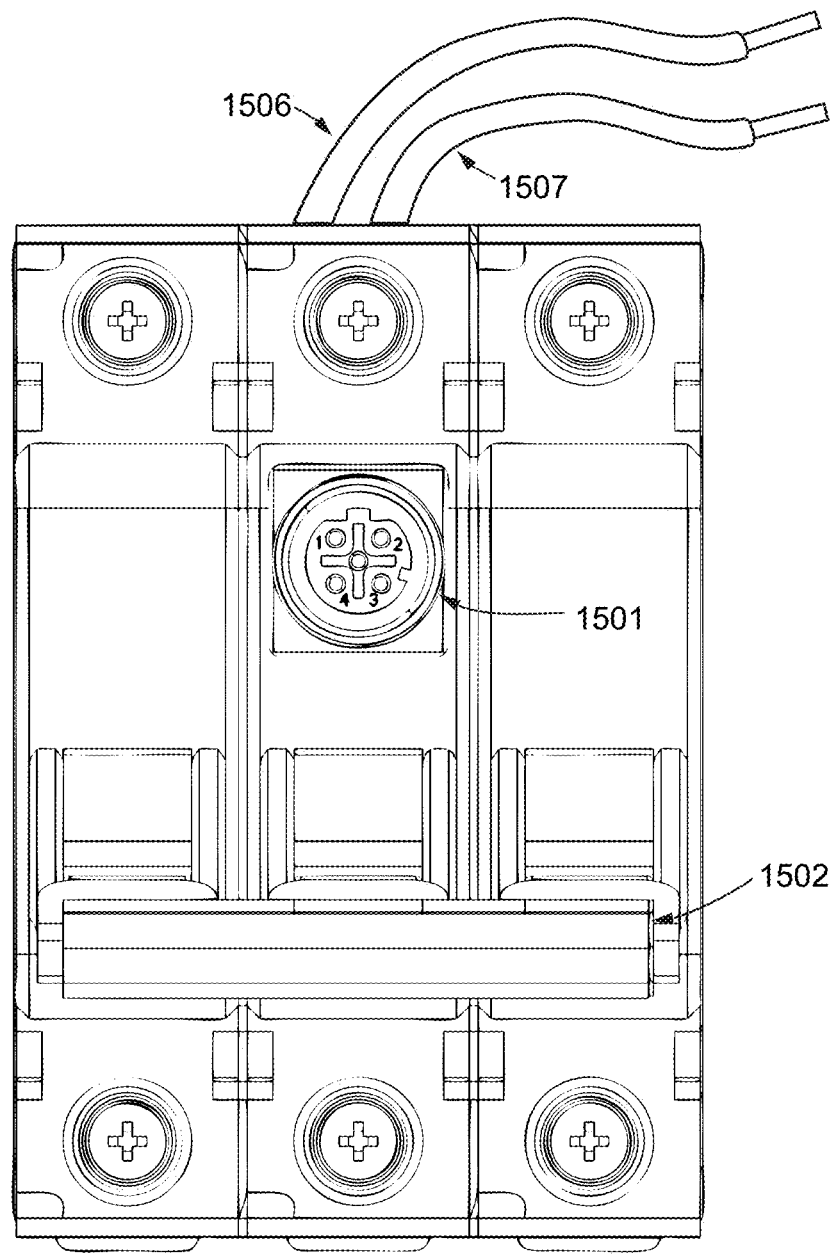

FIG. 15A is a perspective view of a 3-phase circuit breaker plug assembly 1500 with aviation circular connector 1501 and combined triple-pole throw switch 1502. The assembly includes common 1506 and ground leads 1507, as indicated to attach directly to the combination breaker/plug body units, which insert onto the hot bus bar with shoes at the opposite end of the body. FIG. 15B shows the 3-phase combination breaker/plug assembly 1500 in plan view. The body units are contacted at lateral walls and are fitted with a common throw bar.

Figure 16:
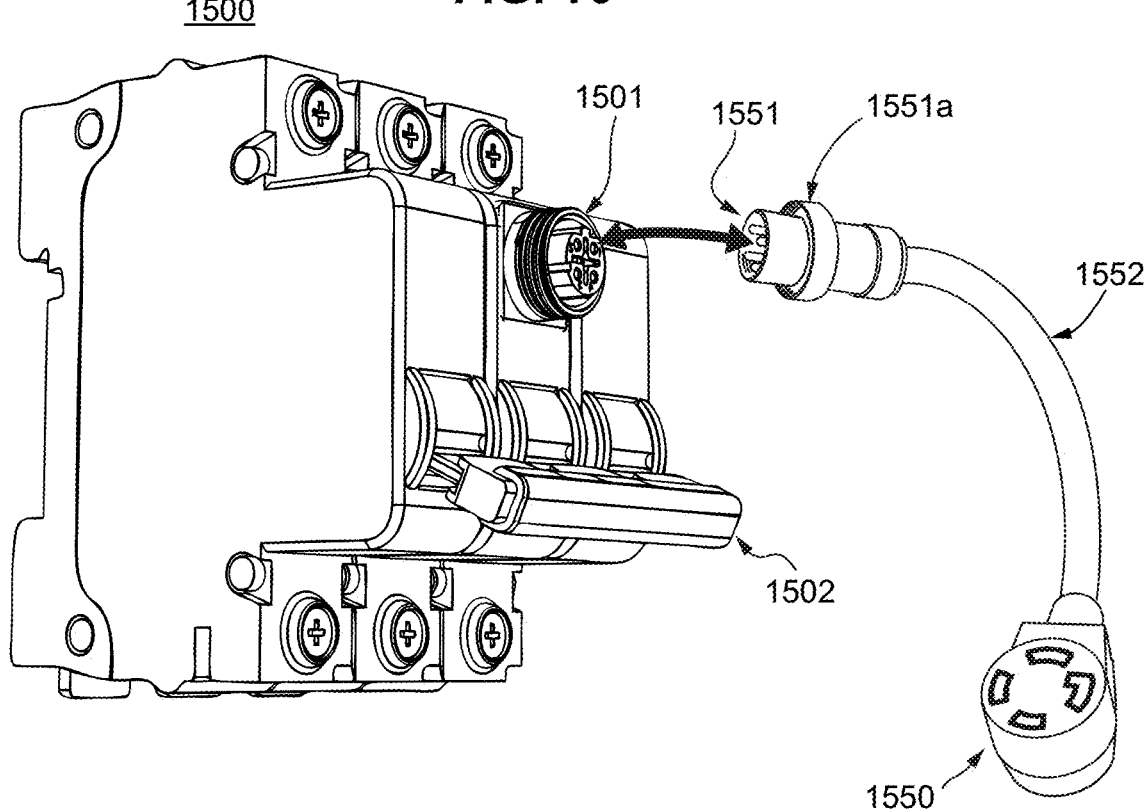
FIG. 16 shows the three-pole circuit breaker/plug device in a context of use.

FIG. 16 shows triple circuit breaker/plug combination 1500 with aviation-type circular plug receptacle 1501 in a context of use with a plug cord adaptor 1552. The breaker housing is slotted or otherwise toed so as to mount directly and engage the hot bus bar(s) of a breaker panel. Voltage on each of the hot bus bars is returned on a single common and is controlled with a single combined throw switch 1502. Common and ground leads are wired to the common and ground bus bars of the breaker panel. In this instance, the receptacle is configured with an aviation circular connector 1501 rather than a NEMA receptacle. The 4-pin circular connector 1501 is configured to receive (as an adaptor) a mating aviation connector 1551 with male pins and a safety threaded sleeve 1551a which can be waterproofed to the IP67 or IP68 standard. A gasket may be used inside the connector and inside surfaces of the throw switches. A system of keyways may be used to identify compatible plugs and to ensure that pin wiring is correctly mated across the connector.

Figure 17A:
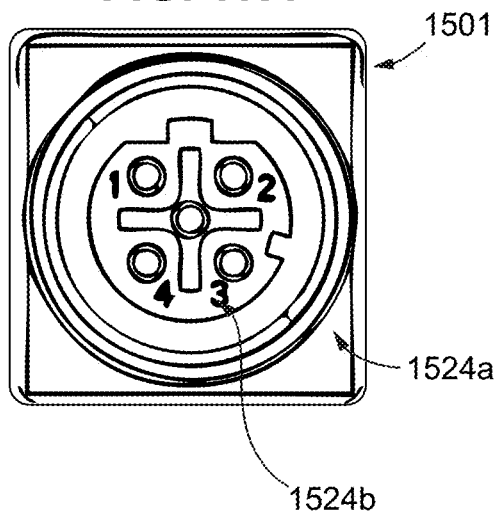
FIG. 17A shows a 4-pin aviation circular connector in plan view with numbered pin receptacles. The female plug end of the L16-30R AC-adaptor shown in FIG. 16 is drawn in plan view in FIG. 17B.

The plug receptacle 1501 is shown in plan view in FIG. 17A. Aviation circular connector 1501 includes numbered pin receptacles. Pin 4 for example may be a common and pins 1, 2 and 3 may be phases for 3-phase power. The face of the plug receptacle is marked 1520a and pin 3 is marked 1524b for reference.

Figure 17B:
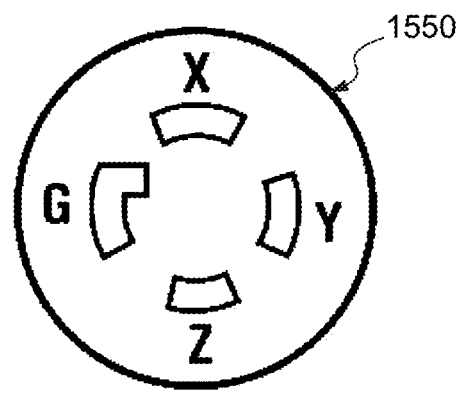

The opposite end of the adaptor 1552 shown in FIG. 16 is drawn in plan view in FIG. 17B. This is a NEMA L16-30R plug 1550 with ground G and phases X, Y, and Z for each of three phases of a 3-phase power supply. The short cord length 1552 may instead be directly wired to an appliance or load in need of electrical power.

In one embodiment, the single receptacle joins three separately fused AC phases to a common return. The breaker assembly also may include solid state components for monitoring operation, such as a green LED when the circuit is correctly installed and all phases are operating correctly and a blue LED when the circuit is live. Operating temperature and load may also be monitored.

As suggested by FIG. 18, the circuit breaker plug assemblies of the invention may be modified to include any of a variety of plug receptacles so as to be compatible with any of a variety of international plug standards. Typically the circuit breaker plug is fitted with a female receptacle so that hot pins are not exposed. It can be seen that the breaker plug assembly is universal device for converting a circuit breaker into a circuit breaker plug for ready access to power directly at a breaker panel. While several examples have been drawn as illustrations, the concept is not limited to any particular plug and receptacle configuration or country of use and may be adapted to other styles of breaker panels.

Examples of various male plugs according to country of use are shown in FIG. 19. These are exemplary and may not include all representative power plugs that are adaptable to the inventive structures and hence the invention is not limited thereto.

FIG. 20 is a graphical representation of various female connectors, here showing receptacles according to the NEMA standard used commonly in the United States. According to various embodiments, these are a representative of those plugs adaptable to the inventive structures, but not fully inclusive collection of plug types that can be adapted to the practice of the invention.

FIG. 21 is a view of "single-keyway" 2101 circular aviation connectors; the connectors have two to nine pin receptacles as commonly known and used. The circuit breaker plug bodies of the invention may be adapted to any of the pin configurations according to various embodiments. A keyway configuration may be assigned to any of the pin layouts so that a correct connection is always made. Embodiments having four or five pins are of interest in that the receptacle and plug may have four or five pins configured for carrying up to three hot phases, a neutral and/or a ground. Alternatively, the connector may be an aviation type receptacle of the "GX16 reverse class" having exterior threads in which the mating plug is a compatible male plug having 2 to 10 pins and a threaded sleeve with internal threads.

FIGS. 22A and 22B are views of two adaptor cords 2200,2250 having each a short cord with two distinct ends. In this representative example, embodiments of various adaptors are shown having each a 4-pin aviation male "reverse" connector on a first end and either a standard NEMA 120 VAC plug 2201 (shown here as a female plug) or a NEMA 240 VAC plug 2251 on a second end. One or more adaptor cords may be supplied with a mating universal circuit breaker plug assembly of the invention as a kit.

FIG. 23 is a view of a combination circuit breaker/plug device 2300 and a "plug-in" adaptor 2320, shown here as useful to convert a 3-prong plug receptacle 2301 with ground to a simple two-prong receptacle that is commonly used for household 15 Amp appliances. A variety of plug in adaptors may be provided. Although this defeats the ground fault features of a circuit breaker, the "plug-in" adaptor 2320 may be fitted with a ground lug and external wire (not shown) as known in the art that is recommended to be connected to a ground strap for safe use. While not ideal, many small appliances are not supplied with 3-prong plugs; hence the need for a two-prong adaptor.

It is contemplated that articles, apparatus, methods, and processes that encompass variations and adaptations developed using information from the embodiments described herein are within the scope of this disclosure. Adaptation and/or modification of the articles, apparatus, methods, and processes described herein may be performed according to these teachings.

Throughout the description, where articles and apparatus are described as having, including, or comprising specific components, or where processes and methods are described as having, including, or comprising specific steps, it is contemplated that, additionally, there are articles and apparatus that consist essentially of, or consist of, the recited components, and that there are processes and methods that consist essentially of, or consist of, the recited processing steps.

It should be understood that the order of steps or order for performing certain actions is immaterial if the embodiment remains operable. Moreover, two or more steps or actions may be conducted simultaneously.

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes.

SCOPE OF THE CLAIMS

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

What is claimed:

1. An electrical outlet with ground fault circuit interrupt protection for making a plug-in electrical connection in a breaker panel, which comprises a dummy breaker body unit configured to be mounted on a hot bus bar in a breaker panel in the manner of a modular circuit breaker unit, the dummy breaker body unit comprising, (a) a raised upper surface, said upper surface is configured to seat with an exposed elevation when in use, the raised upper surface comprising an operable plug receptacle instead of a circuit breaker throw switch; (b) a first wire lead that extends from the dummy breaker body and is connectable in series with a true circuit breaker; (c) a second wire lead that extends from the dummy breaker body and is connectable to a neutral return bus; (d) a third wire lead that extends from the dummy breaker body and is connectable to an isolated ground strap; and, (e) a ground fault circuit interrupt having an operable connection to the plug receptacle.

2. The outlet of claim 1, wherein the dummy breaker body unit is configured to be mounted on the hot bus bar of the breaker panel without making a direct electrical connection to the hot bus bar.

3. The outlet of claim 1, wherein the dummy breaker body unit is configured to be mountable on the hot bus bar of the breaker panel in a cis- or trans-position with respect to the true circuit breaker.

4. The outlet of claim 1, wherein the electrical outlet is configured to be covered by an unopened exterior door of the breaker panel when the electrical outlet is not in use.

5. The outlet of claim 1, wherein the plug receptacle is an aviation-type circular connector configured for receiving two or more pins.

6. The outlet of claim 1, wherein the plug receptacle is a NEMA-type plug receptacle.

7. A combination breaker/plug device in a unitary modular body, wherein the unitary modular body is a single wide circuit breaker body configured to seat on a hot shoe in a single slot of a hot bus bar of a breaker panel, said body having
  (a) a circuit breaker circuit with a throw switch;
  (b) a plug receptacle circuit with a plug receptacle;
  (c) a first wire lead connectable to a neutral bus bar;
  (d) a second wire lead connectable to an isolated ground strap;
  (e) a ground fault circuit interrupt having an operable connection to the plug receptacle circuit; and,
  wherein the circuit breaker circuit and the plug receptacle circuit are connected in series in the unitary modular body and the throw switch and the plug receptacle are disposed on a user-accessible surface thereof.

8. The device of claim 7, wherein the hot shoe of the circuit breaker circuit is electrically connectable to the hot bus bar and a neutral of the plug receptacle circuit is electrically connectable to the neutral bus bar by the first wire, wherein when the circuit breaker is in a closed position, power flows through the circuit breaker circuit to the plug receptacle circuit, the plug receptacle configured to have an electrical plug inserted into the plug receptacle to receive the power.

9. The device of claim 7, wherein the plug receptacle is configured to be covered by an unopened exterior door of the breaker panel when an electrical plug is not inserted in the plug receptacle.

10. The device of claim 7, wherein the plug receptacle is an aviation-type circular receptacle configured for receiving two or more pins.

11. The device of claim 7, wherein the plug receptacle is a NEMA-type receptacle.

\* \* \* \* \*